United States Patent [19]

Laverty, Jr. et al.

[11] Patent Number: 5,769,120
[45] Date of Patent: Jun. 23, 1998

[54] INFRARED SENSOR WITH REMOTE CONTROL OPTION

[75] Inventors: Martin J. Laverty, Jr., Charlottesville; Robert N. Capper, Jr., Roanoke; Steve Davis, Roanoke; Gary Hamrick, Roanoke; Timothy Eichblatt, Roanoke; Chuck Tavares, Roanoke; Ryp R. Walters, Christiansburg, all of Va.

[73] Assignee: Coyne & Delany Co., Charlottesville, Va.

[21] Appl. No.: 404,527

[22] Filed: Mar. 15, 1995

Related U.S. Application Data

[62] Division of Ser. No. 156,370, Nov. 23, 1993, Pat. No. 5,508,510.

[51] Int. Cl.$^6$ ........................................................ E03C 1/05
[52] U.S. Cl. ................................. 137/624.11; 251/129.04; 4/623

[58] Field of Search ........................... 251/129.04; 4/304, 4/305, 623; 137/624.11

[56] References Cited

U.S. PATENT DOCUMENTS

| | | | |
|---|---|---|---|
| 4,762,273 | 8/1988 | Gregory et al. | 251/129.04 X |
| 4,941,219 | 7/1990 | Van Marcke | 251/129.04 X |

*Primary Examiner*—Kevin Lee
*Attorney, Agent, or Firm*—McAulay Fisher Nissen Goldberg & Kiel, LLP

[57] ABSTRACT

A control system for a liquid supply fixture including a microprocessor for receiving inputs from a plurality of sources and to provide outputs to a plurality of receivers for the control of the liquid supply fixture, and a collection of inputs receivable by the microprocessor from sources activated in response to infrared rays received after transmission from an infrared transmitter associated with the microprocessor to activate a liquid supply control to control the supply of liquid to the fixture.

20 Claims, 16 Drawing Sheets

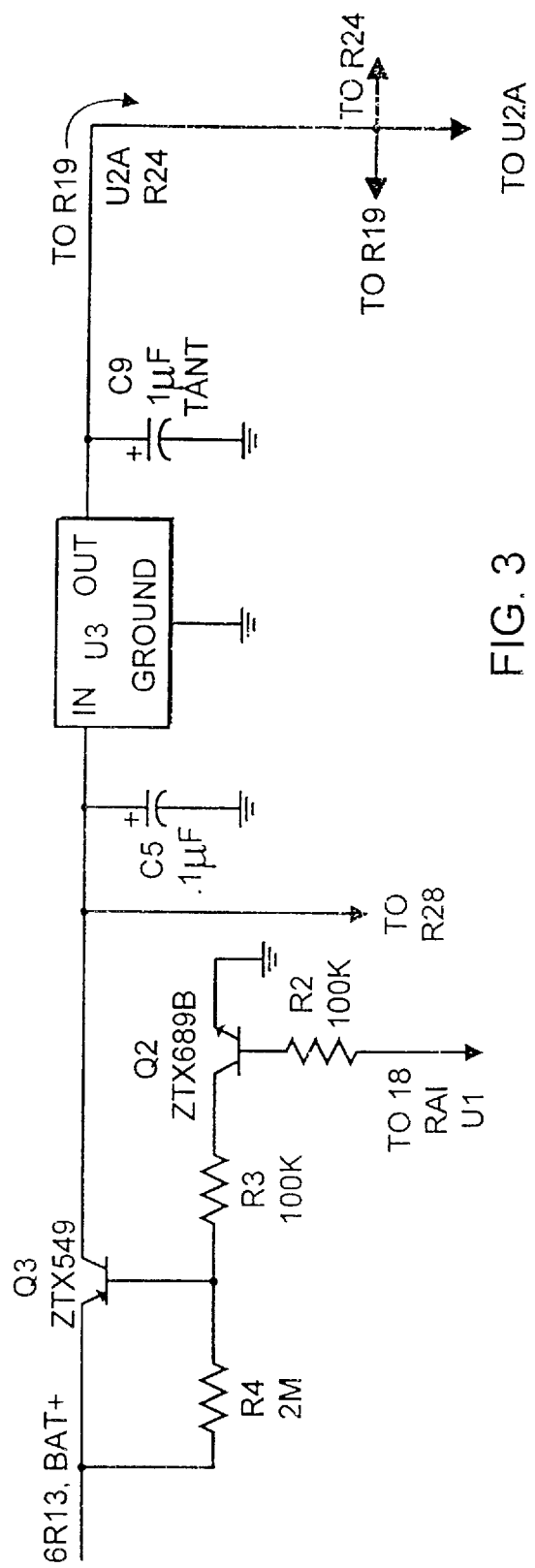
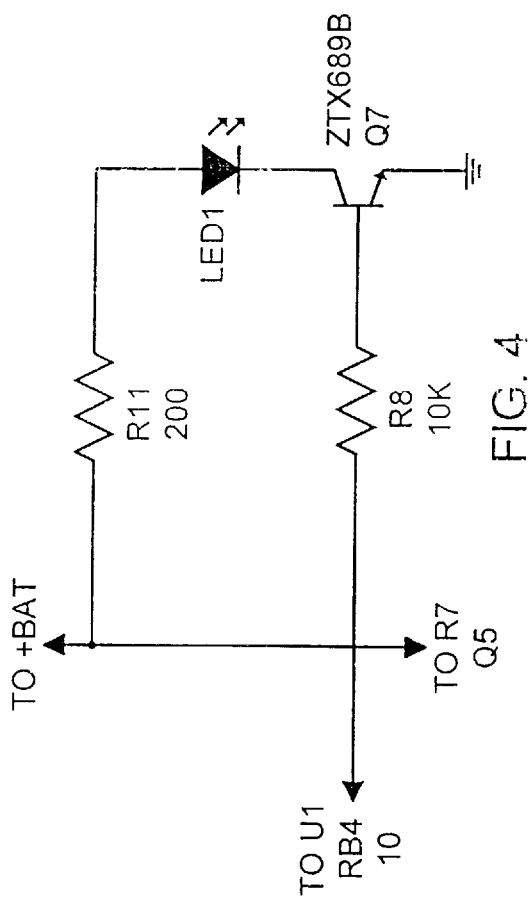
FIG. 3
FIG. 4

INFRARED SENSOR WITH REMOTE CONTROL OPTION

This is a division of application Ser. No. 08/156,370, filed Nov. 23, 1993, now U.S. Pat. No. 5,508,510.

BACKGROUND OF THE INVENTION

1. Field of the Invention

This invention is concerned with a liquid supply unit which is a low power means such as a low power battery and includes a low battery indicator rendered operative in response to activation by an infrared controlled electronic sensor.

More particularly, the invention is concerned with an electronic sensor and solenoid valve contained in a single unit for operating one form of a liquid supply unit, in particular, a flush valve and which is operable with a low battery and includes a low battery indicator.

This invention is also applicable to liquid supply units such as water supply units and, in particular, to the supply of water to plumbing fixtures.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Description of the Prior Art

This invention is an improvement over U.S. Pat. No. 4,793,588 assigned to Messrs. Coyne & Delany Company, the assignee of this application, and the inventor of which is Martin J. Laverty, Jr.

The aforesaid U.S. Pat. No. 4,793,588 is incorporated herein by reference so that if any portion of the disclosure is necessary to complete this disclosure, it can be used even though it now forms part of the prior art and background of the invention.

The flush valve of the prior art, when used with the present invention, is also operable without an external handle.

This invention as well as the earlier invention and U.S. Pat. No. 4,793,588 referred to hereinbefore is also concerned with the replacement of an operating mechanism for a standard manufacturer's flush valve and the replacement of the conventional cover with a novel replacement cover and control module containing the solenoid valve and a sensor module employing the novel circuitry and microprocessor according to the present invention.

The prior art controls of the U.S. Pat. No. 4,793,588 are generally operable so that the control module is operable with 24 volts AC which is in turn connected with 24 volts DC.

SUMMARY OF THE INVENTION

One of the features of this invention is the provision of a solenoid valve in a solenoid valve body or other liquid or water supply unit for an infrared sensor operated flush valve employing novel circuitry and a microprocessor which can be controlled externally by means of a remote unit to avoid having to access the internal parts of the water supply unit.

A feature of the present invention is the use of a power supply, such as a six volt lithium battery, which in turn further reduces the problem of shock so that, should a fault occur in the circuitry, there is no possibility of an external shock to a user of the plumbing device. Moreover, the use of a six volt long-life lithium battery increases the time interval between which battery replacement is necessary.

The invention also provides for tunnel sections angled at 16° to the horizontal plane to narrow the beam to which a photodiode is responsive as part of a returning signal from a remote object.

A further feature of the invention is a deactivation circuit to reduce the drain power on the six volt battery when the system is in its non-operating mode.

Another feature of the invention is to provide at least one flush every 24 hours after the last flush for sanitary reasons.

It is clear that, with the present invention, no electrical connections are required and improved efficiency and hygiene is provided. Moreover, with the low voltage installation there is a greater opportunity to avoid any shock.

In addition to the normal test of the flush valve once every 24 hours and the low battery indicator, a visual range adjustment is also provided.

The invention in general employs a microprocessor or microcontroller based infrared electronic sensors used to detect and signal or act on the presence of objects within their field of view and in particular to a method by which new and unique user controllable features and functions useful in the sensor's intended application may be incorporated into such a sensor and done so with a minimum added cost.

While it may be technologically feasible to incorporate a microprocessor or microcontroller device into such infrared sensor circuitry, the present invention, in addition to providing novel circuitry, also adds new and unique software features that enhances the utility and maintainability of the product.

The difficulty and inconvenience of partially disassembling a product such as that disclosed in the prior art to access protected controls or connections are overcome with the use of a remote control to vary the parameters of the operating unit and the prohibitive costs in connection with the inclusion of most if not all features that were beyond adjusting the sensing range and flush time. With the present invention, it is not necessary to disassemble the product to make these adjustments which are time consuming, error prone and a troublesome task. Moreover, the type of environment encountered in some types of plumbing applications are such that it would not be desirable to provide controls or connections readily accessible without disassembly as they would be subject to damage from environmental conditions and vandalism.

By utilizing a two way infrared communication link between a portable controlling instrument and a self contained battery powered infrared sensor, or an infrared sensor with battery retained memory, and powered by other means, and employing it in conjunction with the retentive memory and appropriate controlling software, to provide for an automatic range adjustment function commanded by an infrared remote control.

The invention provides for an automatic range adjust function that may be added and the control of the features may be most economically and efficiently integrated into the micro-controller or microprocessor based infrared sensor's circuit design.

BRIEF DESCRIPTION OF THE DRAWING

FIG. 1 which is composed of two sheets of drawings designated

FIG. 3 illustrates a power control switched regulator or voltage regulating circuitry for a photodiode and associated amplifier circuitry;

FIG. 4 illustrates a low battery indicator circuitry;

FIG. 10 which is composed of two sheets designated

FIG. 11 which is composed of two sheets designated FIG. 12 which is composed of three sheets designated

DESCRIPTION OF THE PREFERRED EMBODIMENTS

Figure 1A:
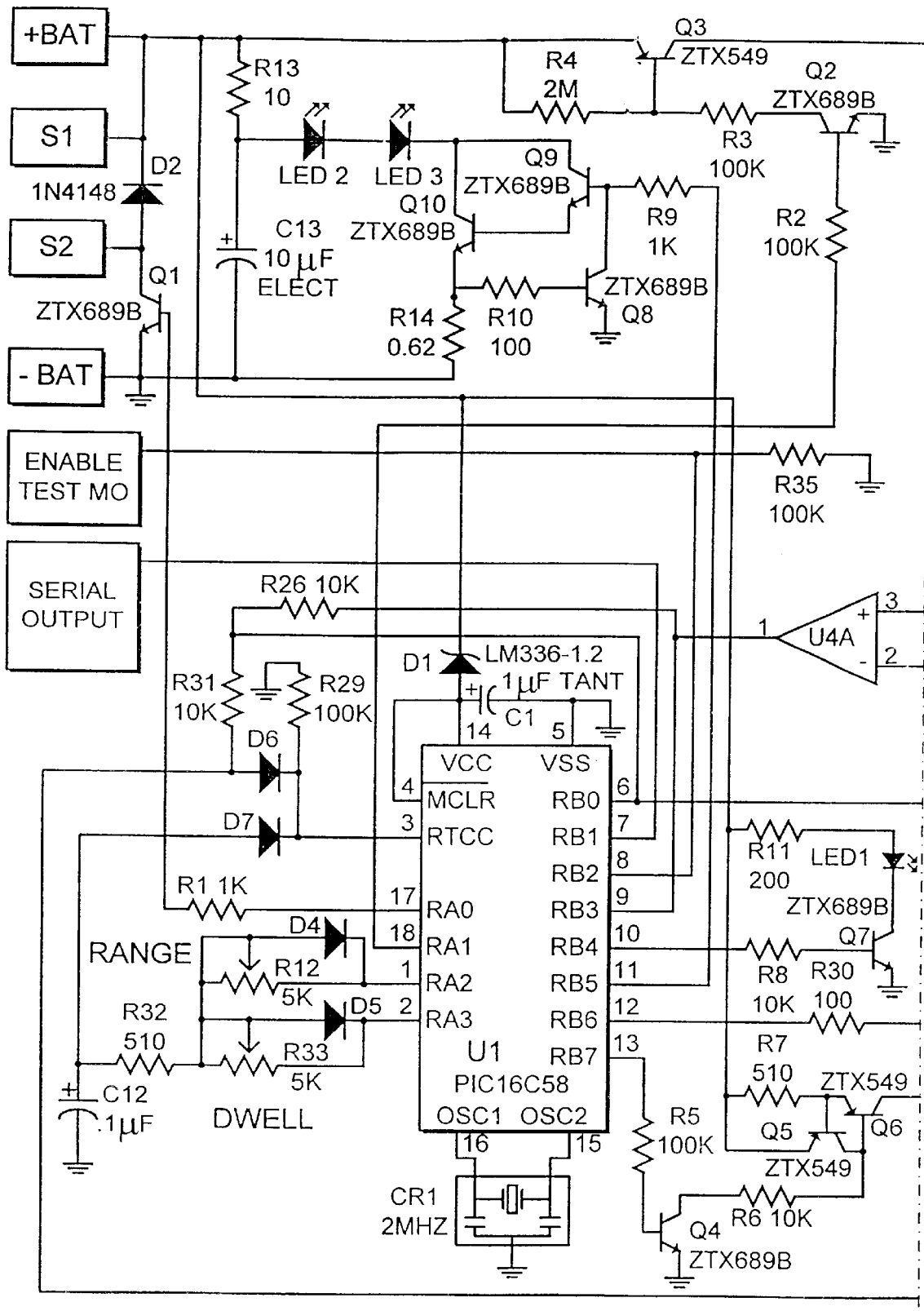
FIG. 1A and FIG. 1B, is one embodiment of an electronic diffuse infrared sensor according to the invention and shows the entire circuitry.
Figure 1B:
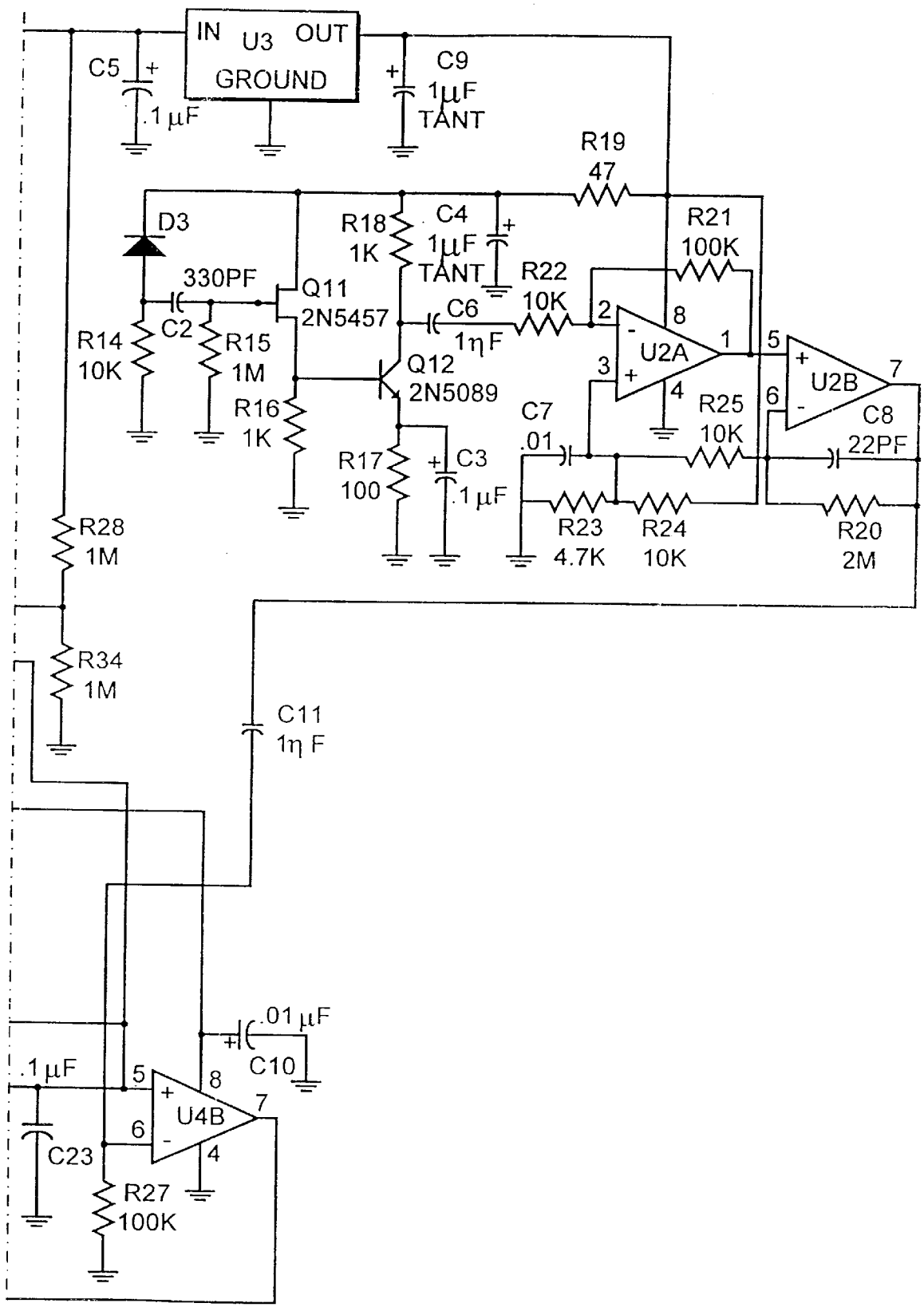
Figure 2:
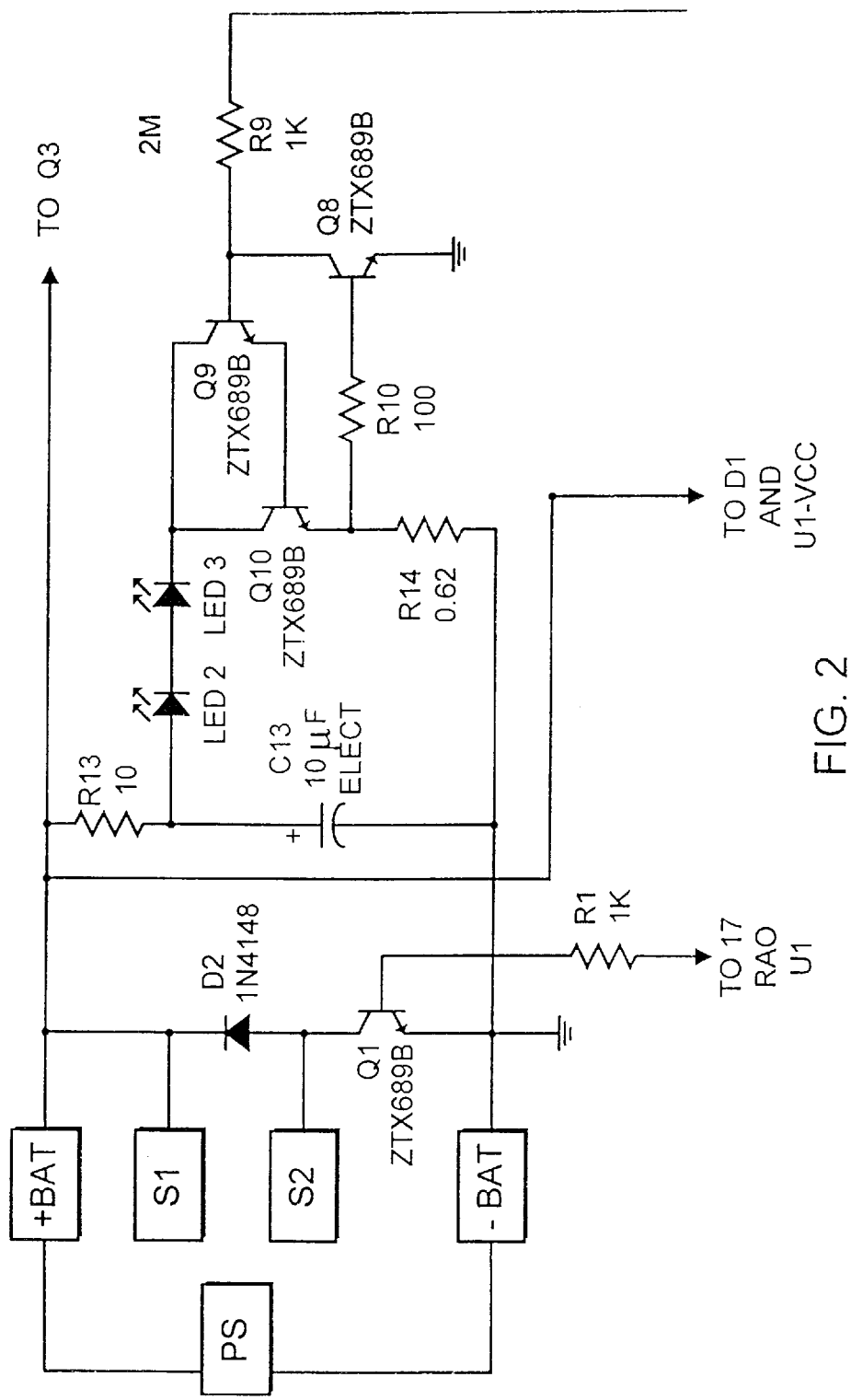
FIG. 2 is a portion of the circuitry of FIG. 1 and shows the solenoid driver circuit and an output device controlling means for controlling an external device.

Referring now more particular to FIG. 1 composed of FIGS. 1A and 1B and FIG. 2 which is a portion thereof and illustrates the solenoid driver D2, Q1 and R13, and output device controlling means forming part of the electronic diffuse infrared sensor shown in FIG. 1 for controlling an external or separate device, such as a solenoid (not shown), and comprises a power supply PS having a positive and a negative terminal connected across BAT+ and BAT−. The circuitry is electrically powered, preferably by a battery typically comprising two primary lithium cells of three volts having the battery's negative terminal connected to the point labelled −BAT and its positive terminal is connected to the point labelled +BAT. Power is at all times provided to point S1 to which a means of controlling an output device comprising valves controlling, such as for example, a flush valve or a water faucet, as an example, and the circuit includes one or more infrared L.E.D.(s) and their driving circuitry comprising R13, C13, LED2, LED3, Q10, Q9, Q8, R14, R10 and R9.

Referring now more particularly to FIG. 3 which illustrates a power control switched regulator circuitry comprising Q3, Q2, R4, R3, R2, C5, U3 and C9 for a photodiode and associated amplifier circuitry. Current is supplied by U1 through an output to the base of Q2 via R2. Q2 turns on causing current to flow in the base of Q3 via R3 enabling Q3 to turn on and source current to the voltage regulating circuitry comprising C5, U3 and C9.

Referring to FIG. 4 which illustrates the low battery indicator circuitry and comprises R11, R8, LED1 and Q7.

Figure 5:
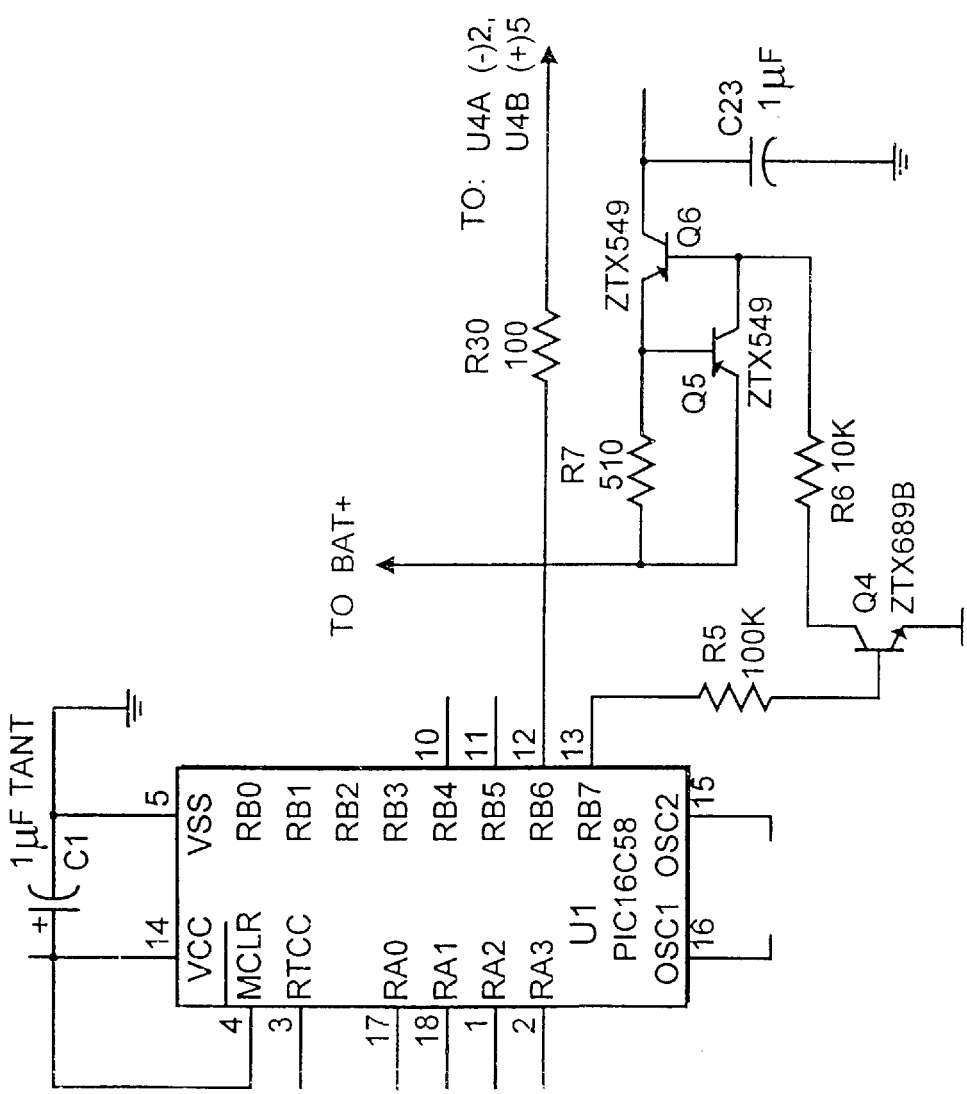
FIG. 5 illustrates the time to voltage converter circuitry.

FIG. 5 shows the time to voltage converter circuitry comprising R5, R6, R7, Q4, Q5, Q6, R30 and C23.

Figure 6:
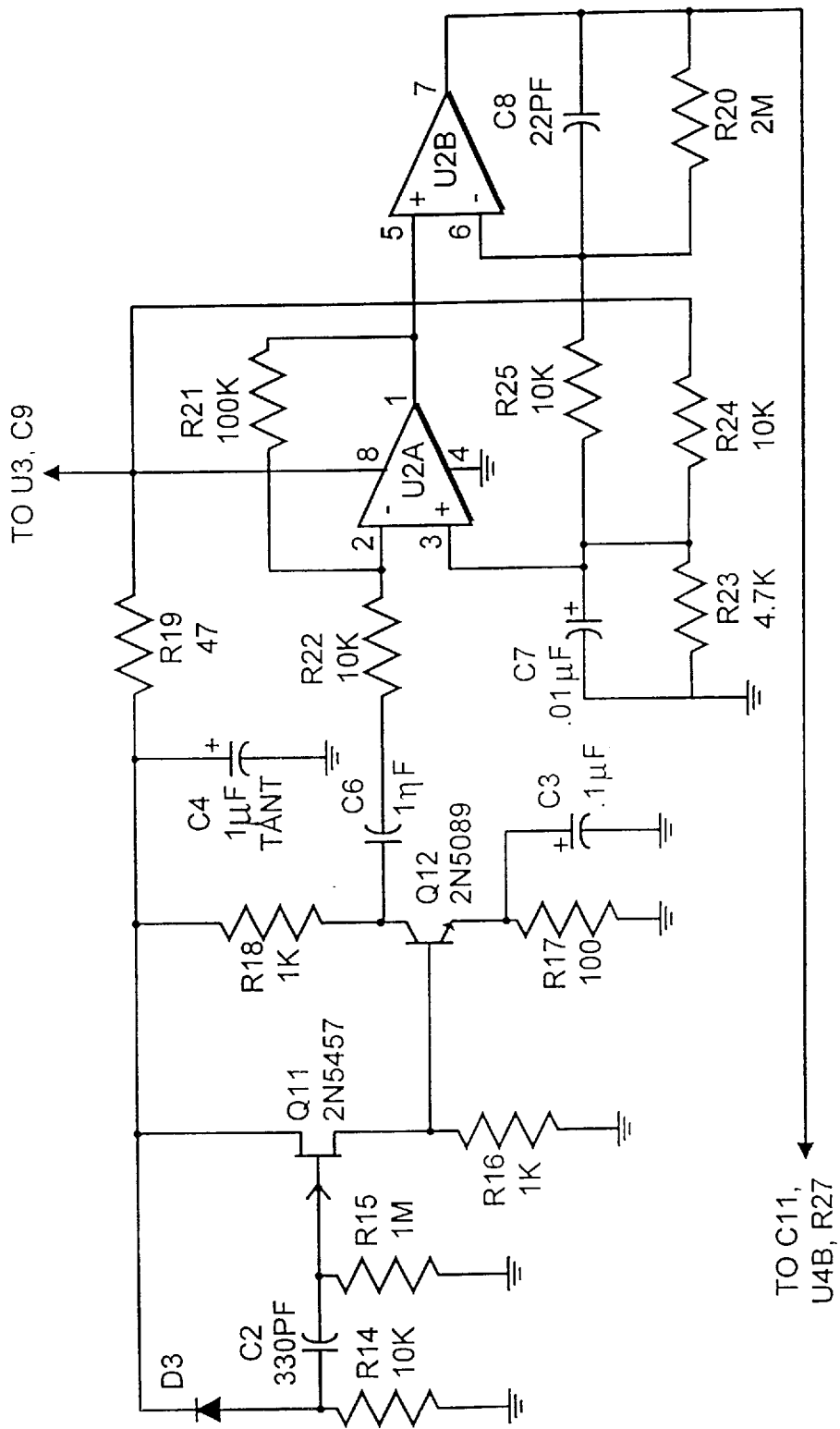
FIG. 6 illustrates circuitry portion for detection and amplification of the signal transmitted by the LED's and reflected.

FIG. 6 shows the circuitry for the detection and amplification of the signal transmitted by the LED's, i.e., LED2 and LED3 shown in FIG. 1A and reflected by an object in the field of view of the sensor or transmitted infrared signal from a portable controlling instrument via circuitry comprising D3, R14, C2, RI5, Q11, R16, Q12, R18, R17, C3, C6, R22, U2A, R21, C7, R23, R24, R25, U2B, R20, C8, C11, R27, R19 and C4. It should be noted that the preferred LED's are infrared LED's.

Figure 7:
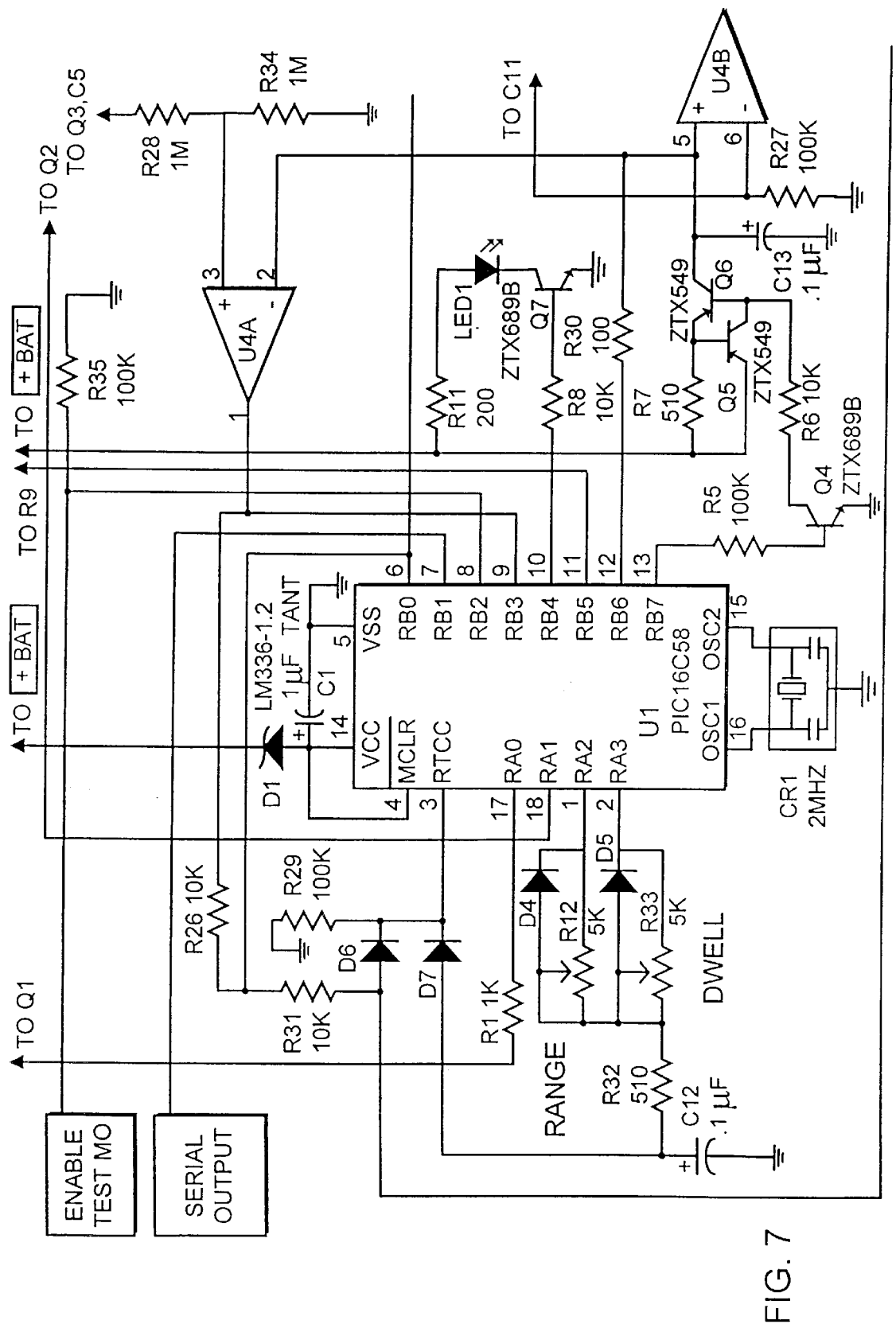
FIG. 7 illustrates a diagnostic serial output feature of the circuit.

FIG. 7 sets forth the diagnostic serial output feature and includes the enable test mode signal and serial output signal, and includes R35, contact 8-RB2 of U1 and contact 7-RB1 of U1.

Figure 8:
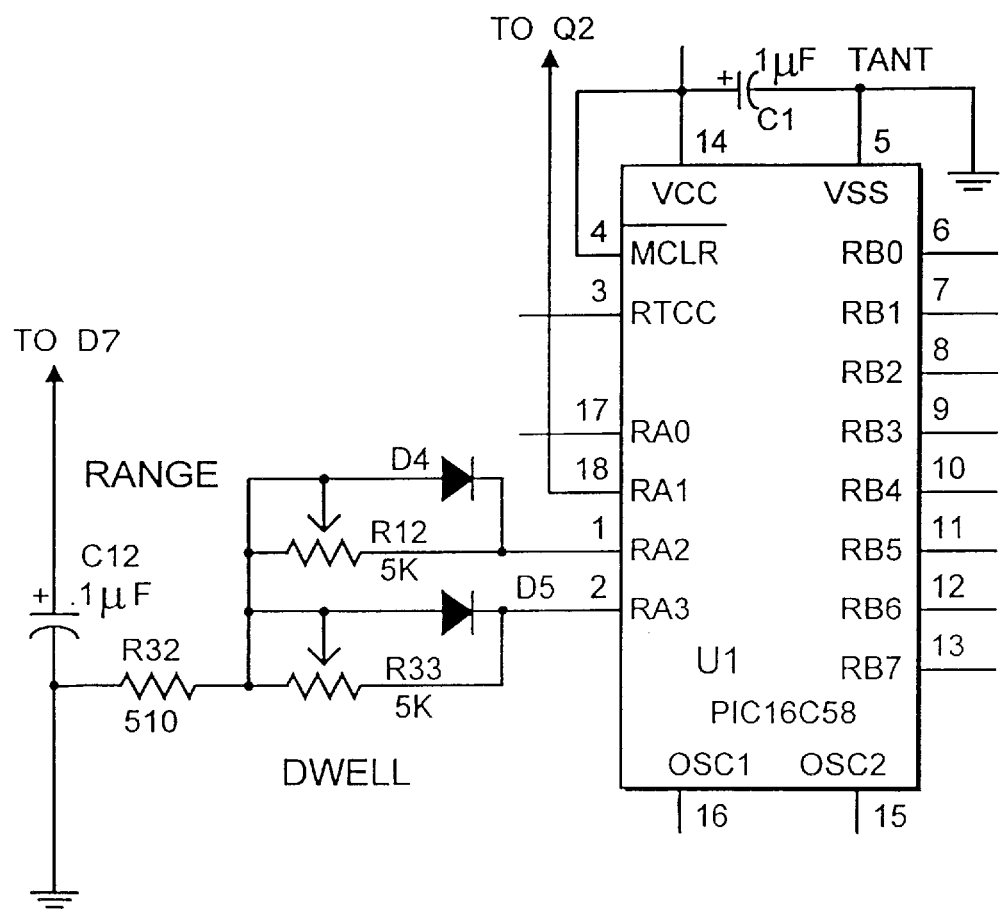
FIG. 8 illustrates the manual range and dwell adjustment and setting.

Referring to FIG. 8 which shows the manual range and adjusting potentiometers. The adjusting potentiometers are R12 and R3, and FIG. 1G includes R12, R33, R32, C12, D4 and D5.

Figure 9:
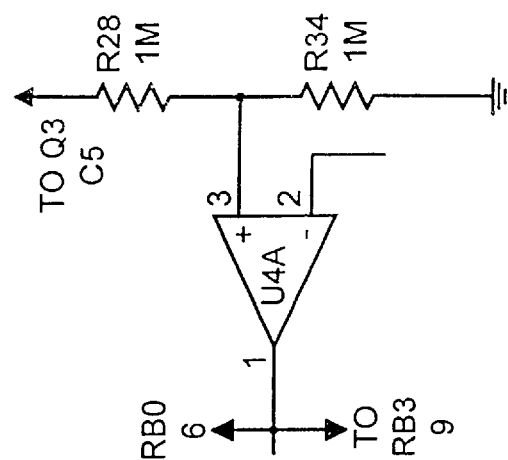
FIG. 9 illustrates battery voltage reading circuitry.

Referring to FIG. 9 which shows a battery voltage reading circuitry and this includes a voltage divider R28, R34 connected with U4A.

DESCRIPTION OF OPERATION OF FIG. 1 CIRCUITRY

The microcontroller integrated circuit supply current reducing element D1 is shown connected with BAT+ and microcontroller U1.

Provisions are made for switching means, see FIG. 2, for controlling an output device to thereby provide it with operating current via connecting point S2 and transistor switch Q1. D2 is provided to prevent circuitry damage from switching inductive output devices.

The purpose of the voltage regulating circuitry (C5, U3, C9) is to provide an operating voltage to the photodiode and associated amplifier circuitry that will not decrease as the battery voltage decays over time. The voltage regulator U3 will provide a stable 4.0 volts output down to a battery voltage of approximately 4.1 this being, one means, enabling circuit operation down to approximately 4.1 volts and thereby extending useful battery life. The purpose of R4 which connects the base and emitter of Q3 is to insure that Q3 turns fully off so that no current is drawn during non-sensing operation of the circuitry.

Referring to the manual RANGE and DWELL adjustment potentiometers labeled respectively R12 and R33, means are provided by circuitry comprising additionally R32, C12, D4, and D5 whereby the microcontroller is able to read the settings of the adjustments as a local manual means of user control of the circuit range and dwell parameters. By providing voltage on pin 1 of U1 and simultaneously switching pin 2 from a grounded to a high impedance condition. (Note, the control is via control of software resident inside the microcontroller which has control of the status of all pins labeled RA# and RB#. This also applies to any similar reference where U1 sets/switches ... pin x ... ). Current is sourced to C12 via R12 and R32 causing C12 to accumulate a charge at a rate determined by the setting of R12 and subsequently causing the voltage across C12 to rise. Once the voltage across C12 rises above the threshold voltage of D7 that voltage minus the threshold voltage of D7 is switch by D7 to appear across R29 and at pin 3 of U1. Time is counted until the voltage at pin 3 of U1 reaches a detection threshold of approximately ⅔ the voltage at pin 14 of U1. The voltage is supplied from Pin 1 of U1 via R12, R32, D7. Ultimately U1 gets power from its voltage supply pin 14 via D1 from the battery. The time that is counted is then stored and used to control the range of the sensor. The dwell setting is read in an identical manner, but the functions of pins 1 and 2 are reversed and current is caused to flow initially through R33 instead of R12. The purpose of diodes D4 and D5 is to provide a means of rapidly discharging variable capacitor C12 via resistor R32 in order that the range and then the dwell settings may be read one after the other without an undue delay as C12 discharges to a zero volts starting point.

This method provides an economical means of reading manual settings with a relatively high resolution of typically as high as from 1 part in 16 to 1 part in 128 as may be required to properly control aspects of circuit operation.

Means are provided for facilitating manufacturing testing via connection points labeled ENABLE TEST MODE and SERIAL OUTPUT. This feature provides for an economical way to test and debug sensors in production by providing a means of enabling a software routine within the sensor to communicate to a computer over a wired connection the contents of the microcontroller's internal memory registers as a means of discerning aspects of the circuit's operation that would be useful in quickly determining the nature of manufacturing defects that may be present as well as implementing automated manufacturing processes and methods.

Referring to the L.E.D. driver circuitry (see FIG. 2), means are provided to decouple high current pulses provided to LED2 and LED3 comprising R13 and C13. Means are also provided to regulate the current supplied to LED2 and LED3 in order that the range of circuit operation is not affected by decaying battery voltage over time. When a current is sourced by U1 to the base of Q9 via R9, Q9 turns on causing increasing current to be sourced to the base of Q10 thereby causing an increasing current to flow in the emitter of Q10 and R14 subsequently developing an increasing voltage across R14 which is fed back to the base of Q8 via R10 causing Q8 to turn on and limit the current flowing into Q9 thereby causing current flow in the circuit to stabilize approximately at the point at which the voltage across R14 is equal to the threshold voltage of the emitter base junction of Q8.

Referring to the photodiode and associated amplifier circuitry power control switched regulator circuitry, FIG. 3, means are provided to switch operating current on and off to the photodiode and associated amplifier circuitry in order to conserve power when the sensor is not actively determining presence or communication with a remote programming instrument comprising R2, R3, R4, Q2, Q3.

In the time voltage time converter circuitry, U1 simultaneously switches pin 12 from a grounded to a high impedance 10 condition and outputs a current on pin 13 to the base of Q4 via R5, Q4 turns on causing an increasing current to be sourced via R6 to the base of Q6 thereby causing an increasing current to flow in the emitter of Q6, R7 and via the collector of Q6 to C23. Current flowing in R7 causes a voltage to develop across R7 and consequently the emitter base junction of Q5. When the voltage across R7 reaches the threshold voltage of the emitter base junction of Q5, Q5 turns on to inhibit further increase in current to be supplied to the base of Q6 causing a constant current to be supplied by the collector of Q6 to C23. The purpose of R30 is to insure that C23 starts a zero volts by discharging it to ground via R30 into pin 12 of U1. The effect of this circuitry is to provide battery voltage independence and to cause a linear voltage ramp to be developed across C23. It is this voltage that is controlled and supplied to said battery voltage reading circuitry and said photodiode and associated amplifier output level detecting circuitry. This implementation of these functions provides an efficient flexible means of accomplishing these required functions in a most precise manor with a minimal expense.

The battery voltage reading circuitry in FIG. 9, which includes a voltage divider comprising R28 and R34 is connected to the collector of Q3 the output of the photodiode and associated amplifier circuit power control switch in order that it will only draw power from the battery only during operation of the photodiode and associated amplifier circuit. Battery voltage is read by enabling power to the photodiode and associated amplifier circuit, turning on power to the voltage comparator integrated circuit U4A via pin 9 of U1, turning on the time to voltage converter circuitry and counting time at a rate such that when the voltage presented at U4A pin 2 by the output of the time to voltage converter circuitry crosses the voltage level presented to pin 3 of U4A by the voltage divider causing the output of U4A at pin 1 to transition from a high to a low level. At this point the time count is stored and may be interpreted directly as the voltage in tenth volt units. In this manner the battery voltage is precisely read with a resolution of one tenth of a volt.

Referring to the photodiode D3 and associated amplifier circuitry, the cathode of photodiode D3 is reverse biased by voltage provided by the photodiode and associated amplifier circuit power control switched regulator circuitry and further filtered by filter control R19 and C4 of the detection and amplifier circuit to remove undue electronic noise that may be present. The anode connects to circuit ground via R14 which acts as a current to voltage converter in order to convert the current mode signal generated in the photodiode as a function of incident infrared energy into a voltage. The value is selected to be relatively low to prevent saturation of the photodiode in strong light such as sunlight. Additionally the signal is passed immediately through a high pass filter comprising C2 and R15 in FIG. 6 in order to discriminate more effectively the very high frequency signal presented by the reflected or transmitted infrared from the low frequency noise presented by various types of fluorescent lighting fixtures. At this point the signal is presented to an impedance transforming circuit comprising field effect transistor Q11 and resistor R16 that act to convert the signal to a low impedance to be presented to the input of the low noise amplifier circuitry comprising Q12, R18, R17 and C3.

The signal, being amplified by the low noise amplifier circuitry, is next presented to additional general amplification provided by circuitry comprising U2A, U2B, C6, R22, R21, C7, R23, R24, R25, R20 and C8. The output signal is then further conditioned by C11 and R27 in order to convert the signal that is positive and negative going about an operating bias point presented to amplifiers U2A and U2B by the junction of R23 and R24 into a positive going ground referenced signal to be presented to the input of the output level detecting circuitry comprising U4B and said time to voltage converter circuitry. The purpose of this conversion is to make the signal more compatible with the output of the time to voltage conversion circuit (against which it will be compared) which is also a positive going ground referenced signal.

If the polarity of the signal is traced through the various stages of amplification it will be found that at this point, the positive going signal which may be observed in response to the infrared pulse output by LED2 and LED3 and reflected by an object within the sensors field of view or output by a remote instrument actually corresponds to the falling edge of that incident infrared pulse.

This method is employed so as to make best use of the limited dynamic range offered by the integrated circuit amplifiers U4A and U4B operating a low operating voltage of 4 volts and in doing so to thereby significantly extend the useful sensing range of the circuit.

Referring to said means of photodiode and associated amplifier output level detecting, the conditioned output of said photodiode and associated amplifier at the junction of C11 and R27 is presented to pin 6 of U4B. A reference threshold level that is provided by turning on the time to voltage converter circuit for a period of time inversely proportional to the range set point. When said conditioned output of said photodiode and associated amplifier exceeds said reference level, the output of voltage comparator integrated circuit U4B at pin 7 transitions from a high to a low level thereby switching off D6 and allowing the voltage at pin 3 of U1 to be clamped to ground by R29 thereby signaling the microcontroller that there is an object in the field of view of the sensor reflecting a sufficient amount of energy to cause the output of said photodiode and associated amplifier to reach the range set threshold. The presence of an object is thereby detected.

CR1 is a ceramic resonator similar to a crystal and provides a stable time base for many of the time critical operations performed by the microcontroller U1.

D1 is a low power voltage reference capable of operating to below 10 microamperes thereby causing the operating voltage supplied to pin 14 of U1 to be lowered by nearly twenty five percent. Since the current drawn from the battery by microcontroller U1 is among other things dependent upon the operating voltage at pin 14, the inclusion of this element conserves a significant amount of energy thereby extending useful battery life.

R35 is to insure that pin 8 of U1 remains at ground when the enable test mode is not externally selected.

Portions of the source code for the procedure which actually performs the functions of a sensor for the control of a liquid supply unit. Due to the formatting requirements of patent applications, some portions of this and other portions of source code provided herein contain or may contain statements which are wrapped across more than one line (and hence would need to be restored to single-line format, or appropriate leaders inserted before being loaded for execution); but those skilled in the art will readily recognize these instances, and can readily correct them to produce formally perfect code.

```
; THIS PROGRAM IS WRITTEN FOR THE PIC16C5X AND HAS TIMING
;    SEQUENCES WHICH ARE DEPENDENT ON ITS TIMING.
;
;    This version:
;      1) is configured for a clock frequency of 800 KHz, as
;         supplied by a ceramic resonator. At this clock speed,
;         1 clock cycle = 5 usec
;      2) We transmit 11001001 for presence,
;      3) If we get back 11101111, we know a remote is present.
;         As long as we at least get 11XXXXXX, we stay with the
;         remote
;
;------------------------------------------------------------

;------------------------------------------------------------
; Register Equates
;------------------------------------------------------------

PC       equ  02h        ;Program Counter
STATUS   equ  03h        ;Status Register
PortA    equ  05h        ;I/O port A
PortB    equ  06h        ;I/O port B ;------------------------------------------------------------
; Port A bit assigment equates
;   Port A is configured as both input and output as follows:
;      bit 0 - Test 1                  ( Output )
;      bit 1 - Test 2                  ( Output )
;      bit 2 - Receive bit             ( Input )
;      bit 3 - Battery Low indicator LED    ( Output )
;------------------------------------------------------------

Encoder2   EQU  00h          ;Encoder Jumper 2    (IN - active HI )
Test1      EQU  01h
Test2      EQU  01h          ;Test 2 Pin          (OUT - active HI )
IRRec      EQU  02h          ;Received pulse      (IN - active LOW)
IRRecBin   EQU  b'00000100'  ;Binary masking for Received Byte
LED        EQU  03h          ;Battery Low LED     (OUT - active LOW)

;------------------------------------------------------------
; Port B bit assigment equates
```

```
;   Port B is configured as an output port as follows:
;       bit 0 - Flush valve solenoid
;       bit 1 - I/R transmit
;       bit 2 - receiver power on
;       bit 3 - battery low
;       bit 4 - one second timer
;       bit 5 - ** debug **
;       bit 6 - battery check
;       bit 7 - flush time encoder
;-----------------------------------------------------------------
;   Bit Definitions
;
Trans       EQU   00h   ;Transmit Pulse     (OUT - active HI )
Encoder4    EQU   01h   ;Encoder Jumper 4   (IN  - active LOW)
POTvCLK     EQU   02h   ;Digital Pot Clock  (OUT - active HI )
                        ;Manual Pot Feedback (IN -         )
Encoder1    EQU   03h   ;Encoder Jumper 1   (IN  - active LOW)
DATvDQ      EQU   04h   ;Digital Pot Data Line (OUT - active HI )
                        ;Battery Level Feedback (IN -      )
PotEn       EQU   05h   ;Digital Pot Enable (OUT - active HI )
Flush       EQU   06h   ;Flusher            (OUT - active HI )
RecEn       EQU   07h   ;Receiver Power Enable (OUT - active HI )

;-----------------------------------------------------------------
;
; RAM DATA TABLE
;
;-----------------------------------------------------------------

TransVal    EQU   08h         ;Value to transmit
FlushCntLSB EQU   09h         ;Flush Counter,
FlushCntMSB EQU   0Ah         ;Flush Counter
FlagByte    EQU   0Bh         ;Four flags + 2 counters ;       X X X X X X X X
;       \/\/| | | |
;       | | | | | --- Occupied bit (active HI)
;       | | | | ----- More than 4 min. since last use (active HI)
;       | | | ------- Toggle bit for 4 sec. sleep (HI for sleep more)
;       | | --------- Indicates Time or Range (used in Inrc & Decr)
;       | |              (HI for Time, LO for Range)
;       | |
;       | ----------- Counter for # of times person seen before
;       |                  considered present
;       |
;       ------------- Counter for # of times person not seen before
;                          considered not present
```

15

```
FlushTime      EQU   0Ch        ;Current flush setting
ManFlushTime   EQU   0Dh        ;Last recorded Flush switch setting
                                ; in bits 0,1,3; bit 7 indicates if
                                ; 24 hr. flush is active (active HI)
                                ; bit 6 set HI if voltage too low to
                                ; activate solenoid
Range          EQU   0Eh        ;Current Range setting
LastFlush      EQU   0Fh        ;Counter of last use
Holder4        EQU   10h        ;Holds gain value during close sense
Counter2       EQU   11h        ;24 hr flush counter
Counter3       EQU   12h        ;Another general purpose counter
Counter4       EQU   13h        ;Counter used in Remote code
Counter5       EQU   14h        ;Used in several calculations counter
ManADValue     EQU   15h        ;Last recorded Manual Pot Value
AtoDValue      EQU   16h        ;Current A/D Feedback Value
RecPotValue    EQU   17h        ;Current Receiver Pot Setting
Holder         EQU   18h        ;Place holder for A/D transmit
Holder2        EQU   19h        ;Place holder for A/D transmit
Holder3        EQU   07h        ;Place holder for remote A/D transmit
Inverse        EQU   1Ah        ;Temp register for A/D algorithm
Trash          EQU   1Bh        ;Temp register
NumOfBits      EQU   1Ch        ;Number of bits sent
RecByte        EQU   1Dh        ;Holder for received byte
MaskByte       EQU   1Eh        ;Masking Byte for received data
Battery        EQU   1Fh        ;Holder for battery status
                                ;BatteryBad  - b'11011111'
                                ;BatteryWeak - b'11011101'
                                ;BatteryGood - b'11011011'

;-----------------------------------------------------------------
;
; Configuration Bytes
;
;-----------------------------------------------------------------
      ADReadA    EQU   b'00000111'
      ADWriteA   EQU   b'00000111'
      ADReadB    EQU   b'00011110'
      ADWriteB   EQU   b'00001010'

PRESENT    EQU   b'00100000'   ;No. of consecutive detects to be valid
                                     ; max. of 3, in bits 4&5
      NOTPRESENT EQU   b'01000000'   ;No. of consecutive non-detects to be valid
                                     ; max. of 3, in bits 6&7

FlushTimeMask   EQU   b'00001011'
```

```
    FlushTimeAMask EQU   b'00000011'
    FlushTimeBMask EQU   b'00001010'
    FlushTime1Mask EQU   b'00000010'
    FlushTime2Mask EQU   b'00000001'
    FlushTime4Mask EQU   b'00001000'
    FlushTime8Mask EQU   b'00000010'

PotConfig      EQU   b'00000100'   ;Masking for input byte
    BatConfig      EQU   b'00010000'   ;Masking for input byte SetMask        EQU   b'00000010'
    SetTestMask    EQU   b'00100000'
    TimeOrRange    EQU   b'00000100'
    RangeOrFlush   EQU   b'00000010'
    UpOrDown       EQU   b'00000100'
    TempMask       EQU   b'00000110'

;   Valid Received codes
    Normal         EQU   b'00001001'
    RemotePresent  EQU   b'00101111'
    Up             EQU   b'00111001'
    Down           EQU   b'00111101'
    SetTime        EQU   b'00011011'
    SetRange       EQU   b'00011111'
    Flush24Hr      EQU   b'00011101'
    LSBFlush       EQU   b'00011101'
    MSBFlush       EQU   b'00111011'

;   Valid Transmit codes
    XMITVAL        EQU   b'11001001'   ;Regular transmitted value,
                                       ; The two msb's are assumed to
                                       ;   be 1's.
    ReadyToReceive EQU   b'11011001'
    CurrentTime00  EQU   b'11001111'
    CurrentTime01  EQU   b'11001101'
    CurrentTime02  EQU   b'11001011'
    CurrentTime10  EQU   b'11011111'
    CurrentTime11  EQU   b'11011101'
    CurrentTime12  EQU   b'11011011'
    ExtraTrans1    EQU   b'11101011'
    BatteryBad     EQU   b'11011111'
    BatteryWeak    EQU   b'11011101'
    BatteryGood    EQU   b'11011011'

;   Battery Check Values
;     values obtained by applying the voltage then looking at
;     the output of the "A/D"
```

```
        GoodVoltage    EQU    b'11001011'    ;battery voltage = 5.3V
        FairVoltage    EQU    b'11000111'    ;battery voltage = 5.2V
        BadVoltage     EQU    b'11000010'    ;battery voltage = 5.1V?

;Constants

FourMin        EQU    6Eh            ;110*2.2sec=4 min.
        OneDay         EQU    4Eh            ;78*18.43min/count=24 hrs.

;****************************************************************
;----------------------------------------------------------------
;
;              PROM PROGRAM CODE
;
;----------------------------------------------------------------
;****************************************************************

ORG    3FFh           ;RESET STARTING POINT (End of EPROM)

GOTO   RESET

ORG    000h           ;Beginning of EPROM

;----------------------------------------------------------------
;
;              Call vector redirection
;
;----------------------------------------------------------------

CWDT2SEC     BSF    STATUS,05h
             GOTO   WDT2SEC

CWDT1SEC     BSF    STATUS,05h
             GOTO   WDT1SEC

FLUSH        BSF    STATUS,05h
             GOTO   CFLUSH

CCheckConfig BSF    STATUS,05h
             GOTO   CheckConfig

CheckBat     BSF    STATUS,05h
             GOTO   CCheckBat

CTakeAPeak   BSF    STATUS,05h
             GOTO   TakeAPeak
RTakeAPeak   RETLW  00h
```

```
STakeAPeak    RETLW   0FFh
TTakeAPeak    RETLW   0AAh

;
; -- wait 12 msec
;
Wait12m MOVLW   03h           ;12 msec at 800kHz
                ;MOVLW  #4    ;20 msec at 400kHz
        MOVWF   Holder
        CLRF    Counter3

Loop12m DECF    Counter3,1    ;1 cycle \---------------\
        SKPZ
        GOTO    Loop12m       ;1 cycle  > 256 * 2 = 512  \
                ;                /          > 514 cycles
        DECF    Holder,1      ;1 cycle           /= 2.6msec at 800
        SKPZ
        GOTO    Loop12m       ;1 cycle ----------------/ = 5.2msec at 400

RETLW   00h

;
;
;

;---------------------------------------------------------------
;
;       Initial System Setup Procedures
;
;---------------------------------------------------------------

RESET
        MOVLW   ADWriteA      ;Set the Four A Ports
        TRIS    PortA

MOVLW   ADReadB       ;Set the eight B Ports
        TRIS    PortB

MOVLW   b'00000000'   ;Initialize the Output ports
        MOVWF   PortB         ; All off MOVLW   b'00001100'   ;Initialize the Output ports
        MOVWF   PortA         ; All off except Receiver MOVF    Holder3,W     ;Return stored value to RecPot
        MOVWF   RecPotValue MOVF    STATUS, W     ;Check if this is a reset or power-up
```

```
        ANDLW   10H

SKPNZ
        GOTO    CHECKUP     ;Don't initialize if this is a reset

CLRF    FlushCntLSB
        CLRF    FlushCntMSB  ;    Clear 2 bytes of total flush counter
        CLRF    FlagByte     ;    Clear Flag of Occupied et al
        CLRF    FlushTime    ;    Clear Flag of Flushing
        CLRF    Counter2     ;    Clear Counter
        CLRF    Counter3     ;    Clear Counter
        CLRF    Counter4     ;    Clear Counter
        CLRF    ManFlushTime ;    Clear Current Flush Time MOVLW   FourMin      ;    110*2.2sec = 4min timer
        MOVWF   LastFlush    ;    Clear Counter of last use MOVLW   OneDay       ;78*18.43min = about 24 hrs.
        MOVWF   Counter2     ;save it MOVLW   80h          ;Set Pot arbitrarily at half gain
        MOVWF   ManADValue
        MOVWF   RecPotValue
        MOVLW   13h          ;set range to match initial pot setting
        MOVWF   Range BSF     PortB,RecEn  ;Turn ON the receiver
        CALL    CCheckConfig ;Check for any changes in the configuration
        CALL    CheckBat     ;get initial battery status
        BCF     PortB,RecEn  ;Turn OFF the receiver ;----------------------------------------------------------------
;
;               MAIN loop
;
;
;----------------------------------------------------------------

MAIN

;       GOTO    RangeTest

EndRangeTest

;       GOTO    MAIN
```

```
;----------------------------------------------------------------
; Main loop                                                     |
;----------------------------------------------------------------

SLEEPER CALL   CWDT2SEC        ;Set normal WDT timeout to about 2 sec

SLPR2   BSF    PortA,LED       ;Make sure that the LED is OFF

MOVF   RecPotValue,W   ;Store the old value so the remote
        MOVWF  Holder3         ; will have to be in range SLEEP                  ;Go to sleep land ;----------------------------------------------------------------
;
; start execution here following 1 second interrupt
;
;----------------------------------------------------------------

CHECKUP CALL   CWDT2SEC        ;Set WDT timeout to largest possible time

BTFSS  FlagByte,1      ;get inactive flag (bit 1) & skip
                               ;if more than 4 min.
;       MOVF   FlagByte,W      ;get inactive flag (bit 1)
;       ANDLW  02h             ; check it
;       SKPNZ                  ;skip if more than 4 min. of inactive
        GOTO   Often ;if > 4 min. of inactivity, we sleep
                               ; again for 2 more sec. for
                               ; total of 4 sec. between loops MOVLW  04h             ;for getting "sleep again" flag
        XORWF  FlagByte,1      ;toggle flag (bit 2)
        BTFSC  FlagByte,2      ;check it & skip if finished 2 sleep cycles
;       MOVF   FlagByte,W
;       ANDLW  04h             ;check it
;       SKPZ                   ;skip if finished 2 sleep cycles
        GOTO   SLEEPER Often   MOVLW  BatteryBad      ;is battery bad
        SUBWF  Battery,W
        SKPZ                   ;skip if so
        GOTO   BattOK
```

```
        BCF     PortA,LED       ;blink LED
        CALL    Wait12m
        CALL    Wait12m
        BSF     PortA,LED BattOK          MOVLW   XMITVAL
        MOVWF   TransVal        ;Set transmitted value
                                ;We currently send the six LSBs of XMITVAL MOVLW   RemotePresent   ;Set Mask byte to test for a remote
        MOVWF   MaskByte BSF     PortB,RecEn     ;Turn ON the receiver CALL    CCheckConfig    ;Check for any changes in the configuration
        CALL    CTakeAPeak      ;See what we can see
        BCF     PortB,RecEn     ;Turn OFF the receiver ANDLW   0FFh            ;Check if someone is there (FF-y, 00-n)
        SKPNZ
        GOTO    UnOccupied      ;Skip to keeping track of no one there ANDLW   055H            ;See if we saw a REMOTE
        SKPZ
        GOTO    Occupied        ;Skip to keeeping track of occupant MOVF    RecPotValue,W   ;Store the old value so the remote will have to be
in range
        MOVWF   Holder3
        MOVLW   030h            ;Put in range value to be used for
        MOVWF   RecPotValue     ; talking to remote GOTO    REMOTE          ;Jump if REMOTE

;
;       NO ONE IS CURRENTLY THERE
;
;

UnOccupied
        MOVLW   0CFh            ;Clear person there counter
        ANDWF   FlagByte,1

BTFSS       FlagByte,0  ;skip if we someone was there last time
;       MOVF    FlagByte,0      ;Assume that it's been empty a while
;       ANDLW   01h             ;Was someone there previously
;       SKPNZ                   ;Skip next statement if so
```

```
        GOTO    NotHere         ;Skip to where all will know that its open

CALL    CWDT2SEC
        MOVF    RecPotValue,W   ;Store the old value
        MOVWF   Holder4
        MOVLW   010h            ;Put in range value to be used for
        MOVWF   RecPotValue     ; close sensing in closets MOVLW   XMITVAL
        MOVWF   TransVal        ;Set transmitted value
                                ;We currently send the six LSBs of XMITVAL MOVLW   RemotePresent   ;Set Mask byte to test for a remote
        MOVWF   MaskByte BSF     PortB,RecEn     ;Turn ON the receiver
        CALL    CCheckConfig    ;Check for any changes in the configuration
        CALL    CTakeAPeak      ;See what we can see
        BCF     PortB,RecEn     ;Turn OFF the receiver MOVWF   Trash           ;save returned value temporarily
        MOVF    Holder4,W       ;restore original range value
        MOVWF   RecPotValue
        MOVF    Trash,W         ;restore returned value ANDLW   0FFh            ;Check if someone is there (FF-y, 00-n)
        SKPZ
        GOTO    Occupied        ;Skip to keeping track of someone there MOVLW   40h             ;Add 1 to num of periods he's been gone
        ADDWF   FlagByte,1      ;counter in bits 6&7 of FlagByte
        MOVF    FlagByte,0
        ANDLW   0C0h
        MOVWF   Trash MOVLW   NOTPRESENT      ;Get max periods before the big flush
        SUBWF   Trash,0
        SKPZ                    ;Skip next statement if enough time PASSED GOTO    SLEEPER         ;Skip to where all will know that its open CALL    FLUSH           ;Flush the puppy CLRF    FlagByte        ;   Clear Previous Occupant MOVLW   FourMin         ;   110*2.2sec = 4min timer
        MOVWF   LastFlush       ;   Clear Counter of last use
```

```
        GOTO    SLEEPER         ;    Go back to sleep land

;Keep track of how long its been free

NotHere
        DECFSZ  LastFlush,1     ;Has it been long enough?
        GOTO    SLEEPER         ;     If not, catch some ZZZs BSF     FlagByte,1      ;Flag not active - (Longer sleep time)
;       MOVLW   02h
;       MOVWF   FlagByte DECFSZ  Counter2,1      ;Counter for 24 hr. flush
        GOTO    SLEEPER BTFSS       ManFlushTime,7   ;get register with 24 hr flush flag
                                     ; skip if flag set for flush
        GOTO        SLEEPER CALL    FLUSH           ;Flush the puppy GOTO    SLEEPER         ;    Go back to sleep

;
;     SOMEONE IS CURRENTLY THERE !!!
;

Occupied
        MOVLW   3Fh             ;Clear no one there counter
        ANDWF   FlagByte,1

CALL    CWDT1SEC
        MOVLW   FourMin     ;   110*2.2sec = 4min timer
        MOVWF   LastFlush   ;   Clear Counter of last use
        MOVLW   b'11111001;
        ANDWF   FlagByte,1  ;   Clear not-active status BTFSC       FlagByte,0   ;skip if we don't already know he's there
;       MOVLW   01h              ;Check if we already know he's there
;       ANDWF   FlagByte,0
;       SKPZ                     ;Keep going if we don't know

GOTO    SLPR2

MOVLW   10h             ;Add 1 to num of periods he's been busy
```

```
        ADDWF   FlagByte,1   ;counter in bits 4&5 of FlagByte
        MOVF    FlagByte,0
        ANDLW   30h
        MOVWF   Trash MOVLW   PRESENT      ;Get max periods before he's really busy
        SUBWF   Trash, 0
        SKPZ                 ;Skip next statement if just enough time
        GOTO    SLPR2

BSF     FlagByte,0   ;Let Everybody know that he's really there!

GOTO    SLPR2        ;Give him some time to finish
```

;----------------------------------------------------------------
;
;       REMOTE
;
;
;   Registers Used: Counter4    Multiple send counter
;                   TransVal    Value to be transmitted
;                   MaskByte    Mask Byte for Received byte
;
;   Subroutines Called: TakeAPeak   Transmit byte
;                       Holder
;                       Holder2
;                       Trash
;                       Counter3
;                       CheckConfig     Adjust configuration
;                       Holder
;                       Trash
;                       Counter3
;                       SetAtoD     Load A/D convertor value
;                       Trash
;                       Counter3
;
;----------------------------------------------------------------
;
REMOTE
```
        MOVLW   b'11111001'
        ANDWF   FlagByte,1           ;Clear not-active status MOVLW   ReadyToReceive       ;let remote know we see it
        MOVWF   TransVal MOVLW   00h
```

```
        MOVWF   MaskByte

BSF     PortB,RecEn         ;Turn ON the receiver
        CALL    CCheckConfig        ;Check/set config and burn time
        CALL    CTakeAPeak          ;See what we can see
        BCF     PortB,RecEn         ;Turn OFF the receiver SendBattery
        CALL    Wait12m MOVF    Battery,W           ;get battery status
        MOVWF   TransVal            ;send it to remote BSF     PortB,RecEn         ;Turn ON the receiver
        CALL    CCheckConfig        ;Check/set config and burn time
        CALL    CTakeAPeak          ;See what we can see
        BCF     PortB,RecEn         ;Turn OFF the receiver ;
;       main loop once we see remote
;

START   MOVLW   ReadyToReceive      ;Set the Byte to transmit
        MOVWF   TransVal            ;Store it MOVLW   00h                 ;Set mask to skip mask test
        MOVWF   MaskByte MOVLW   03h
        MOVWF   Counter4

SendMore
        CALL    CWDT2SEC            ;Set WDT timeout to longest possible time CALL    Wait12m BSF     PortB,RecEn         ;Turn ON the receiver
        CALL    CCheckConfig        ;Check/set config and burn time
        CALL    CTakeAPeak          ;See what we can see
        BCF     PortB,RecEn         ;Turn OFF the receiver ANDLW   0FFH                ;See if we saw anything
        SKPNZ                       ;see what it is if we did
        GOTO    CountDown MOVF    RecByte,W
        ANDLW   b'11101111'         ;strip off sometimes echoed bit
```

```
        XORLW   RemotePresent  ;check for RemotePresent signal
        SKPNZ                  ;skip if something else
        GOTO    SendBattery    ;send battery status if match CountDown
        DECFSZ  Counter4,1     ;Send multiple times
        GOTO    SendMore ANDLW   0FFH           ;See if we saw anything
        SKPNZ
        GOTO    OUT3           ;Jump if no one there after 3 tries
```

In Table 1 which follows, a sensor according to the invention is related to a software flow chart which follows, and the numbers to the upper left of the blocks refer to the portion of source code line numbers considered to be pertinent and used in connection with the portion of the disclosed preceding source code.

TABLE I

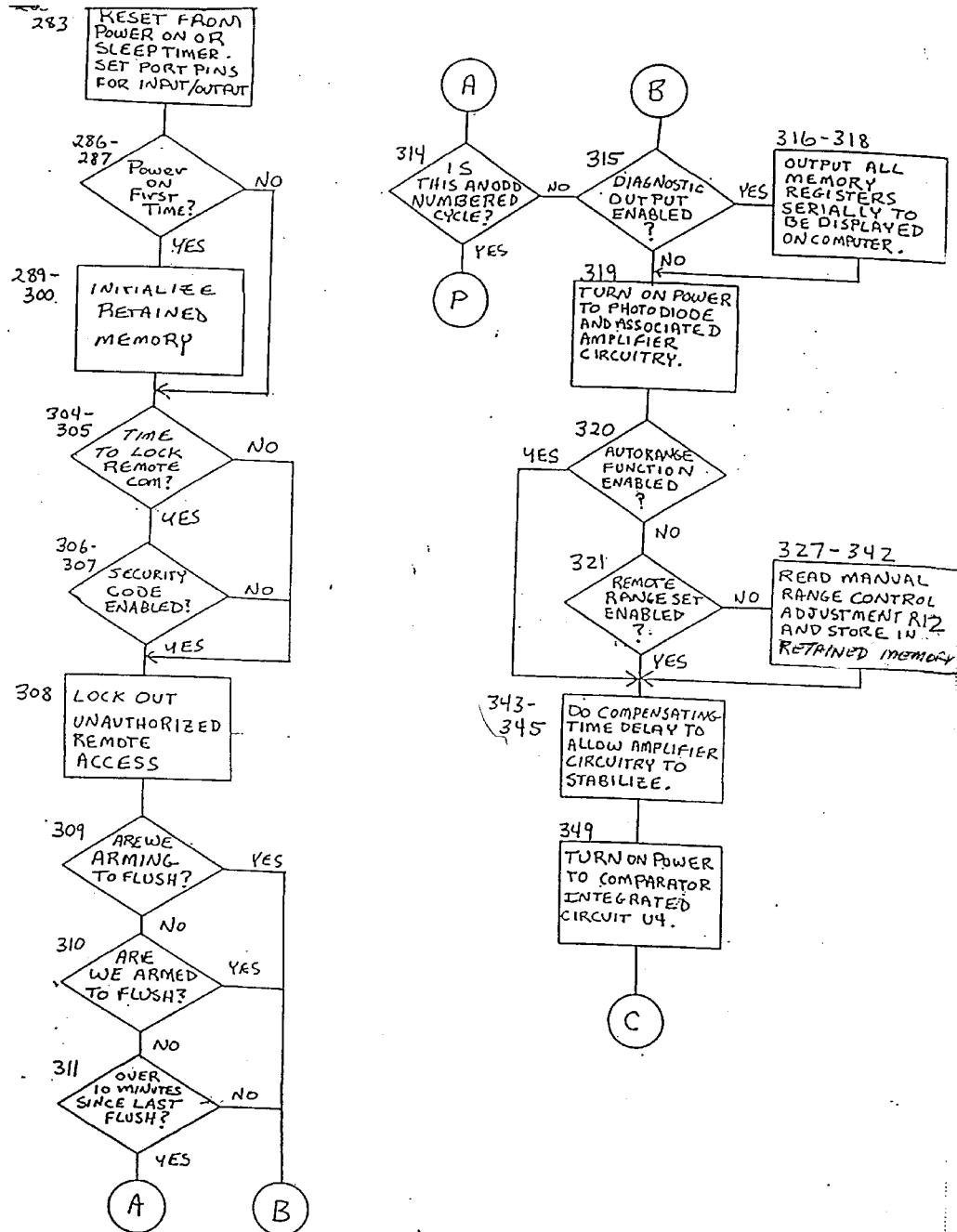

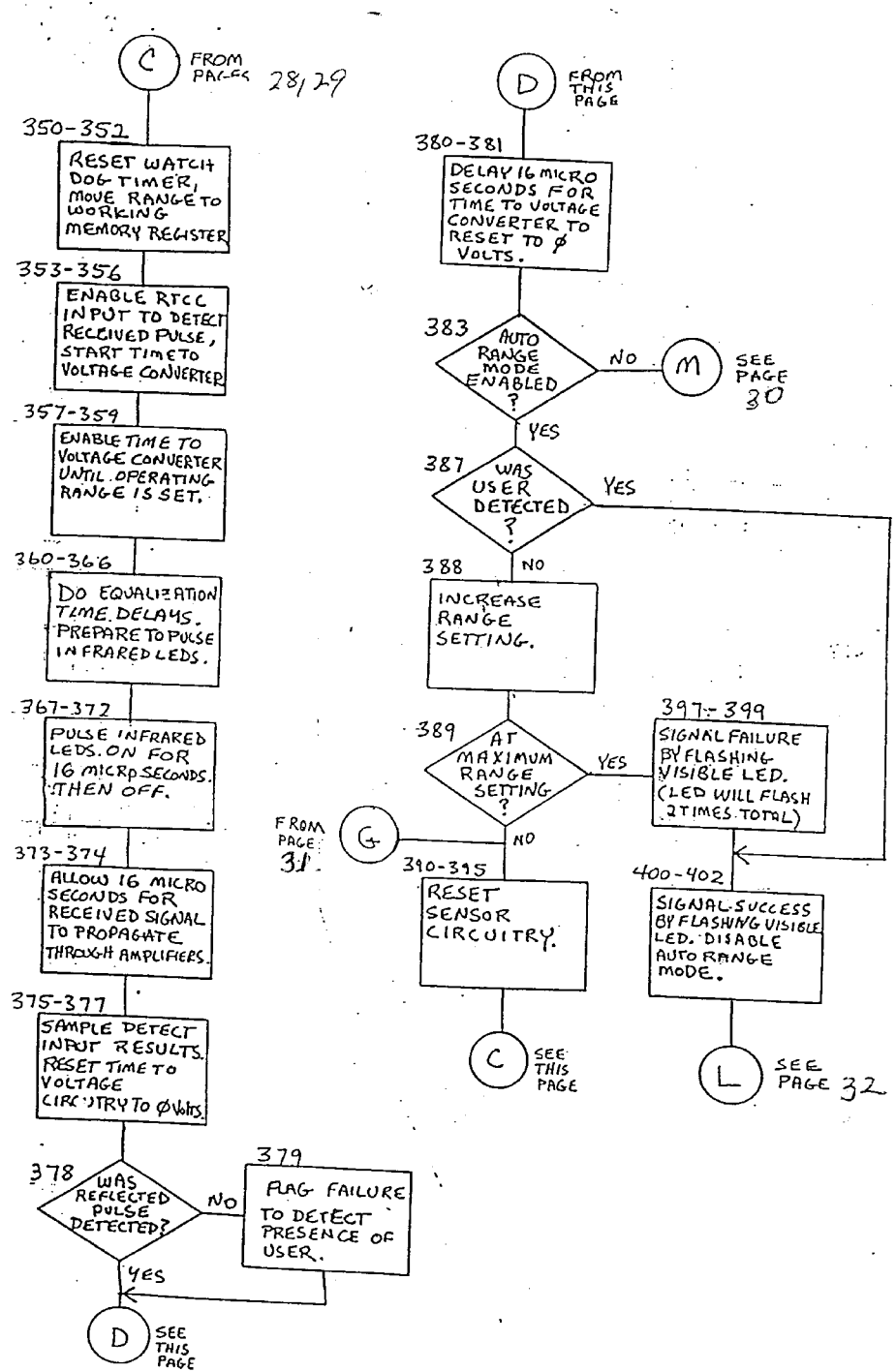

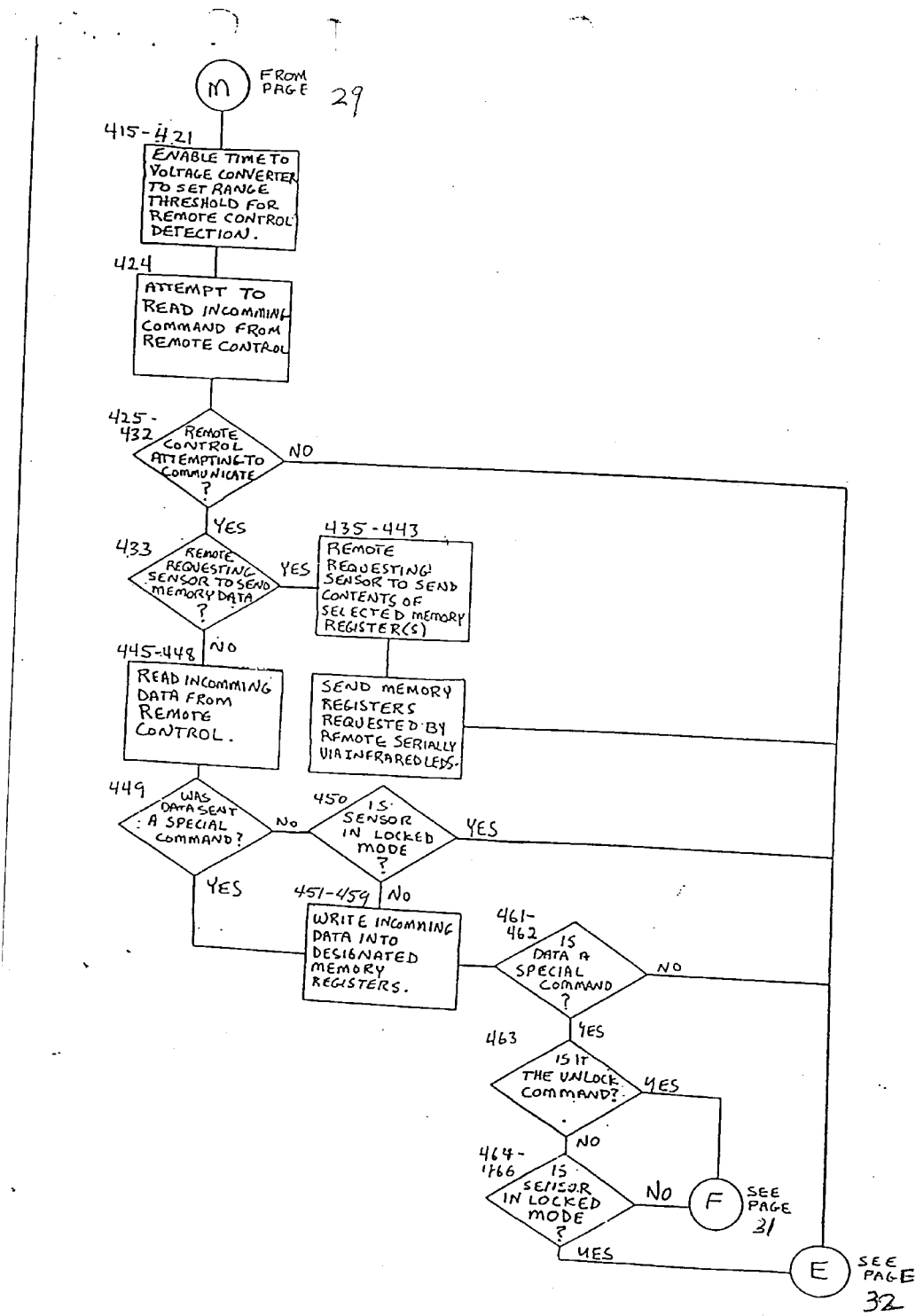

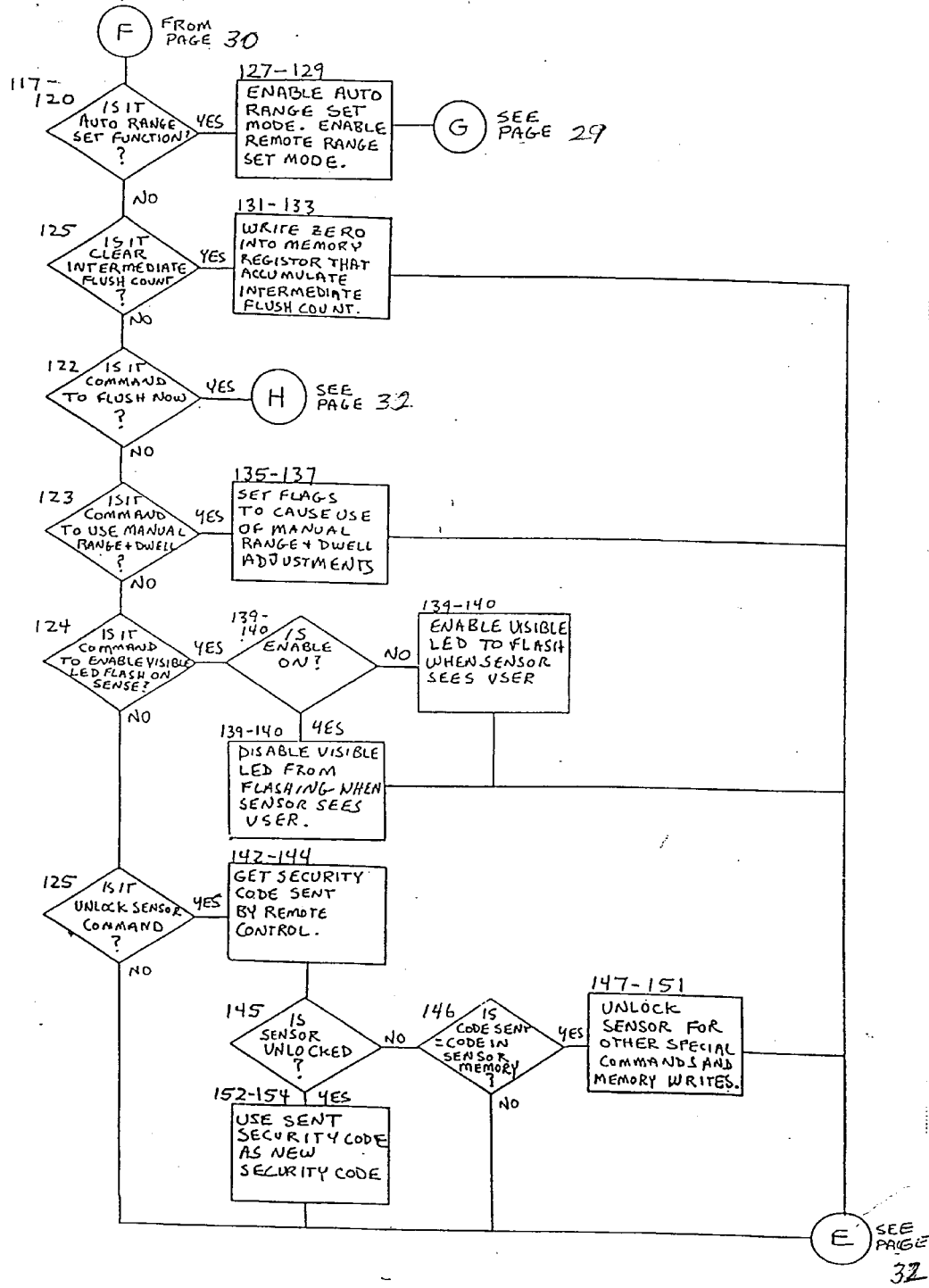

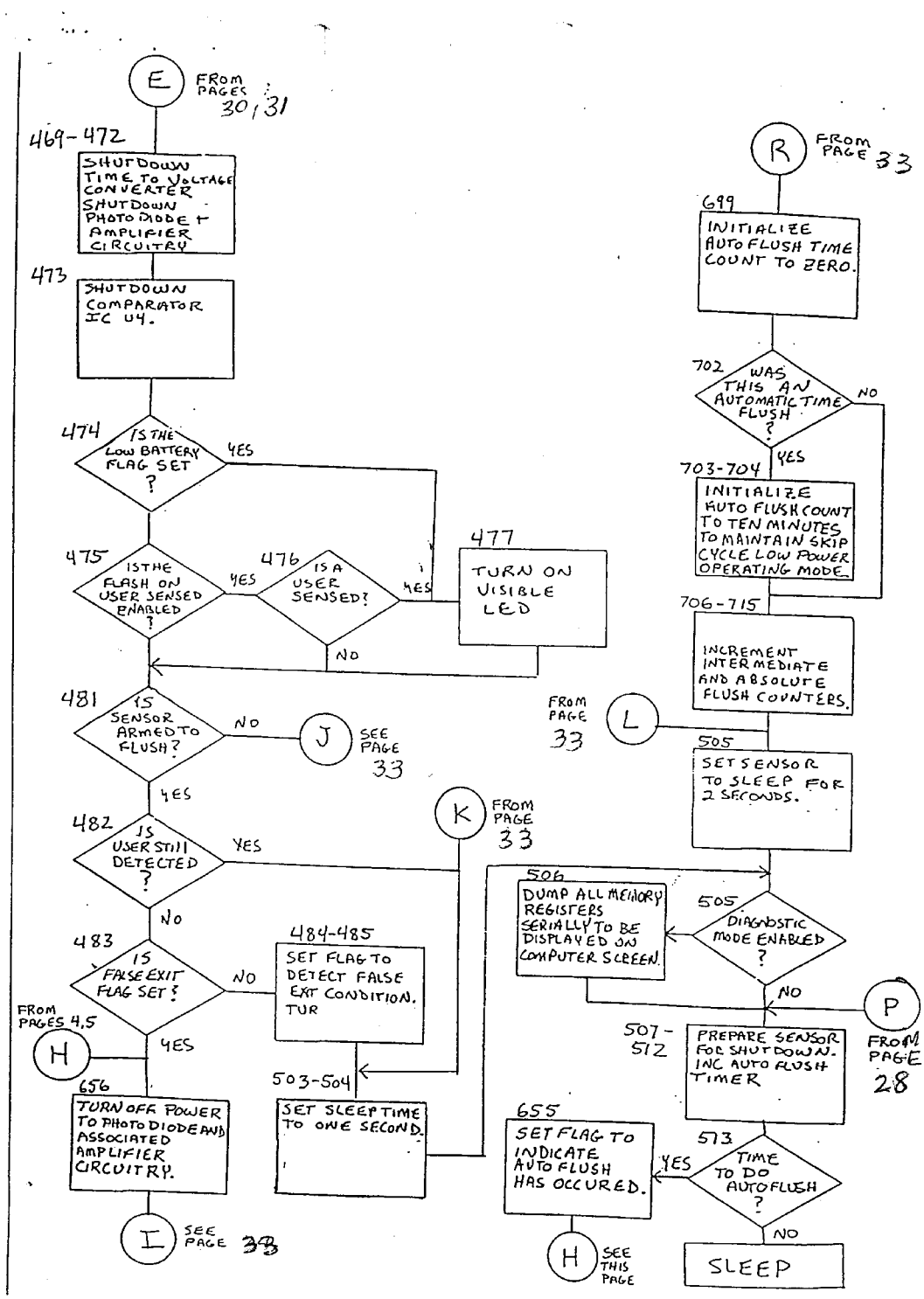

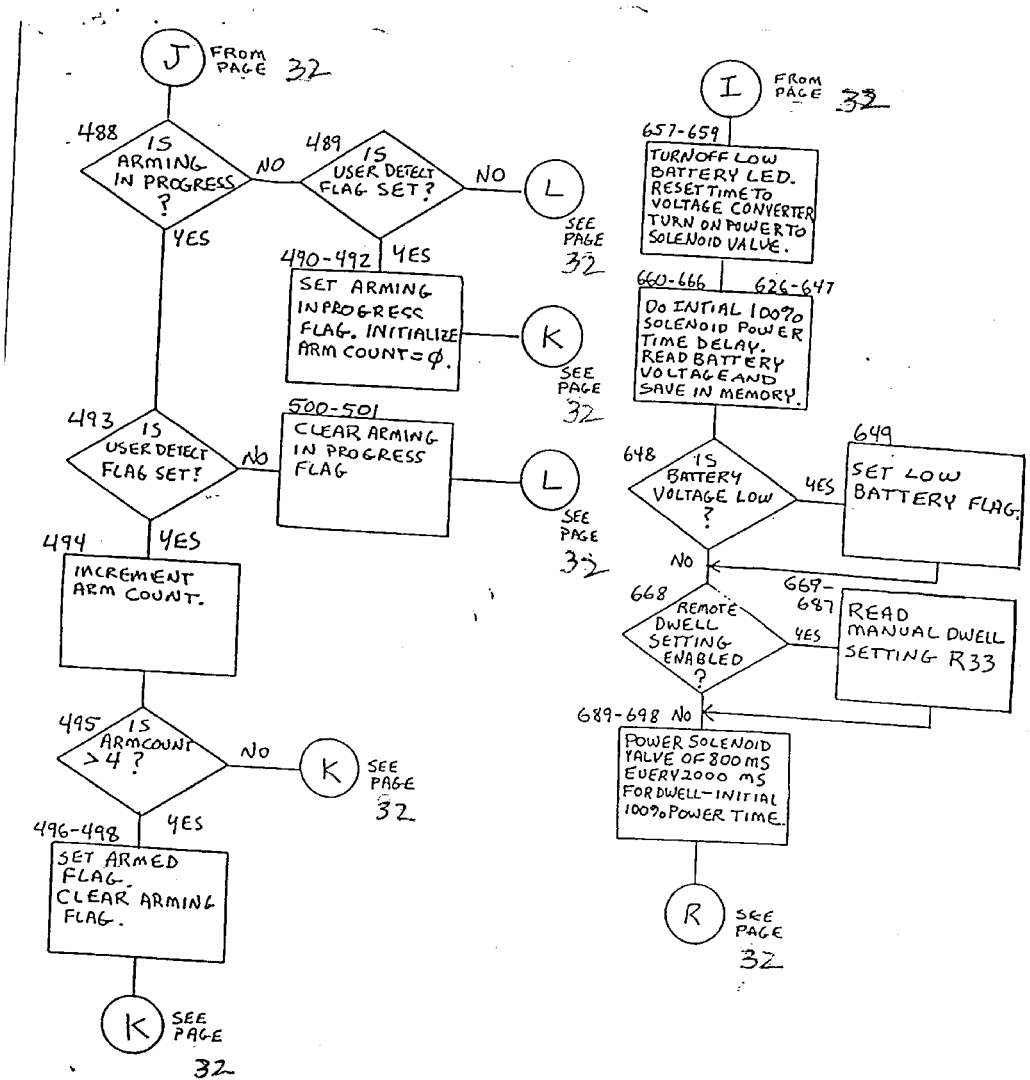

Table II sets forth operating instructions for a typical hand-held two-way communication device using the features of the invention.

TABLE II

IMPULSE OPERATING INSTRUCTIONS"

Flush Time

> Select setting 0 - 7 on S1 located to the left of the sensors. The following is a table of time that current will be applied to the solenoid.

| Setting | Time (sec) |
|---------|------------|
| 0 | 0.8 |
| 1 | 1.3 |
| 2 | 1.8 |
| 3 | 2.3 |
| 4 | 2.8 |
| 5 | 3.3 |
| 6 | 3.8 |
| 7 | 4.3 |

THE TIME OF ACTUAL FLUSH WILL BE DIFFERENT.

Settings 8 and 9 should not be used but for informational purposes they should give: 8 - 0.8 sec, 9 - 1.3 sec.

Range

> Use small screwdriver or similar tool to turn small dial to the right of the sensors. Turned full counter clockwise is the minimum setting which corresponds to approximately 6" and full clockwise is the maximum setting which corresponds to approximately 58". However, the range is highly dependent on the color and type of material in front of the "Impulse" unit, especially [ESPECIALLLY] at longer range distances.

Battery Low Indications

> If the battery is low, either "Weak" or "Bad", the red light on the "Impulse" unit will stay on during the entire solenoid current on period. Typically it just blinks briefly at the beginning of the flush cycle.

Set by "Impulse" or Remote?

> The current setting of time or range is determined by how that setting was last changed. If last changed by the Remote, the setting came from the Remote. If last changed by the "Impulse", the setting came from the "Impulse". For example, when the "Impulse" unit is first powered up with a new battery, if S1 is set at 3, then the solenoid current on time is set at 2.3 seconds. If S1 is then turned to 4, the solenoid current on time will be 2.8 seconds. If the Remote is then used to change the setting to 5, the solenoid current on time will be 3.3 seconds. If S1 is now set to 2, the solenoid current on time will change to 1.8 seconds.

"IMPULSE" REMOTE OPERATING INSTRUCTIONS

General Operation Procedure

1. Turn POWER switch on.

2. Enter Security Code. Digits will clear if correct.

3. Point Remote at "Impulse" unit. Best position is 2" to 5" below and 8" to 15" from "Impulse" unit.

4. Wait for READY light to come on.
If it does not light in 5 seconds, move Remote around very slowly until READY light comes on.

5. Choose and press TIME or RANGE function. Current setting will be displayed.

6. Press UP or DOWN button to change setting.

7. Press TIME or RANGE again to complete function.

8. Change TIME or RANGE again by following steps 5 - 7/

9. Turn POWER off when finished.

Entering Security Code

1. Turn POWER switch on.

2. Enter four digits using the four buttons on the front panel.

3. If the last digit disappears, the code was entered correctly. If it does not disappear, enter the four digits again. If this does not work, turn the Remote unit off, then on and try again.

Checking "Impulse" Unit Battery

1. Turn POWER switch on.

2. Enter Security Code. Digits will clear if correct.

36

3. Point Remote at "Impulse" unit. Best position is 2" to 5" below and 8" to 15" from "Impulse" unit.

4. Wait for READY light to come on. If it does not light in 5 seconds, move Remote around very slowly until READY light comes on.

5. One of the battery status lights should be on.

Green - Good
   Yellow - Weak
   Red   - Bad

The battery may last a long while after reaching the "Weak" state but it should be changed immediately if "Bad" is indicated.

Changing Flush Time

1. Turn POWER switch on.

2. Enter Security Code. Digits will clear if correct.

3. Point Remote at "Impulse" unit. Best position is 2" to 5" below and 8" to 15" from "Impulse" unit.

4. Wait for READY light to come on. If it does not light in 5 seconds, move Remote around very slowly until READY light comes on.

5. Choose and press TIME function. Current setting will be displayed.

6. Press UP button to increase Flush Time or DOWN button to decrease Flush Time. The following is a table of time that current will be applied to the solenoid.

| Setting | Time (sec) |
|---------|------------|
| 0       | 0.8        |
| 1       | 1.3        |
| 2       | 1.8        |
| 3       | 2.3        |
| 4       | 2.8        |
| 5       | 3.3        |
| 6       | 3.8        |
| 7       | 4.3        |

THE TIME OF ACTUAL FLUSH WILL BE DIFFERENT.

7. Press TIME again or remove Remote from in front of "Impulse" unit to complete function.

[9] 8. Turn POWER off when finished.

Changing Range

1. Turn POWER switch on.

2. Enter a Security Code. Digits will clear if correct.

3. Point Remote at "Impulse" unit. Best position is 2" to 5" below and 8" to 15" from "Impulse" unit.

4. Wait for READY light to come on. If it does not light in 5 seconds, move Remote around very slowly until READY light comes on.

5. Choose and press RANGE function. Current setting will be displayed.

6. Press UP button to increase Range or DOWN button to decrease Range. The minimum range setting is 6" and the maximum range setting is 58". However, the range is highly dependent on the color and type of material in front of the "Impulse" unit, [ESPECIALLLY] especially at longer range distances.

7. Press RANGE again or remove Remote from in front of "Impulse" unit to complete function.

[9] 8. Turn POWER off when finished.

Portions or the source code for performing the functions of a sensor for the control of a liquid supply unit according to the second embodiment follows.

Portions of the source code for the procedure which actually performs the functions of a sensor for the control of a liquid supply unit. Due to the formatting requirements of patent applications, some portions of this and other portions of source code provided herein contain or may contain statements which are wrapped across more than one line (and hence would need to be restored to single-line format, or appropriate leaders inserted before being loaded for execution); but those skilled in the art will readily recognize these instances, and can readily correct them to produce formally perfect code.

```
;   ****************************************
;           REMOTE CALLING
;   ****************************************
;

GotSomething
        MOVLW   SetTime
        ANDLW   3Fh
        SUBWF   RecByte,W
        SKPNZ
        GOTO    TimeAdjust MOVLW   SetRange
        ANDLW   3Fh
        SUBWF   RecByte,W
        SKPNZ
        GOTO    RangeAdjust MOVLW   Up
        ANDLW   3Fh
        SUBWF   RecByte,W
        SKPNZ
        GOTO    Increment MOVLW   Down
        ANDLW   3Fh
        SUBWF   RecByte,W
        SKPNZ
        GOTO    Decrement
```

```
            MOVLW   Flush24Hr
            ANDLW   3Fh
            SUBWF   RecByte,W
            SKPNZ
            GOTO    LoFlush MOVLW   MSBFlush
            ANDLW   3Fh
            SUBWF   RecByte,W
            SKPNZ
            GOTO    HiFlush

GOTO    START

Decrement
            BTFSC   FlagByte,3          ;Time or Range flag bit (bit 3)
                                        ;bit = 0 if range
;           MOVLW   08h
;           ANDWF   FlagByte,W
;           SKPZ
;           GOTO    DecTime MOVF    Range,1             ;are we at the minimum already
            SKPZ                        ; skip if so
            DECF    Range,1

BSF     STATUS,05h          ;convert 0 - 27 number to
            CALL    Convert             ; something we can send to the
            BCF     STATUS,05h          ; digital pot MOVWF   Holder3             ;store new value for use after
                                        ; exiting remote routine
            GOTO    Jump DecTime
            MOVF    FlushTime,1
            SKPZ
            DECF    FlushTime,1         ;Got a Down Jump   MOVLW   XMITVAL                  ;Set the Byte to transmit
            MOVWF   TransVal             ;Store it MOVLW   03h
            MOVWF   Counter4

GOTO    SendMore             ;send it 3 times
```

```
Increment
        BTFSC    FlagByte,3          ;Time or Range flag bit (bit 3)
                                     ;bit = 0 if range
;       MOVLW    08h                 ;Time or Range flag bit (bit 3)
;       ANDWF    FlagByte,W
;       SKPZ                         ;bit = 0 if range
        GOTO     IncTime MOVLW    1Ah
        SUBWF    Range,W             ;are we at the maximum already
        SKPZ                         ; skip if so
        INCF     Range,1

BSF      STATUS,05h          ;convert 0 - 27 number to
        CALL     Convert             ; something we can send to the
        BCF      STATUS,05h          ; digital pot MOVWF    Holder3             ;store new value for use after
                                     ; exiting remote routine
        GOTO     There IncTime
        MOVLW    07h                 ;max binary no. (4.0 sec)
        SUBWF    FlushTime,W
        SKPZ                         ;ignore if already at max
        INCF     FlushTime,1

There   MOVLW    XMITVAL             ;Set the Byte to transmit
        MOVWF    TransVal            ;Store it MOVLW    03h                 ;send it 3 times
        MOVWF    Counter4

GOTO     SendMore

LoFlush
        MOVF     FlushCntMSB,W
        MOVWF    Trash
        MOVF     FlushCntLSB,W       ;put current flush count in
        MOVWF    Counter5            ; temp register for calculations ;         divide by 2
        CLRC
        RRF      Trash,1             ;put lsb it carry
        RRF      Counter5,1          ;put carry bit in msb
        MOVLW    01h
        ANDWF    Trash,1             ;strip off all but bit 0
```

41

```
Div5
        CLRF    TransVal                ;counter for tens digit

MOVLW   05h                     ;divide by 5 by repeated subtractions
Div5Loop
        INCF    TransVal,1              ;assume 1 more power of ten
        SUBWF   Counter5,1              ;subtract ten
        SKPNC                           ;skip if remainder less than zero
        GOTO    Div5Loop                ;loop for more subtracts DECF    Trash,1
        SKPNZ                           ;skip if finished with divide
        GOTO    Div5Loop DECF    TransVal,W              ;move tens digit counter back one
        MOVWF   Counter5

GOTO    DaySend                 ;send it to the remote

HiFlush
        MOVF    FlushCntMSB,W           ;put current flush count in
        MOVWF   Counter5                ; temp register for calculations
        CLRC
        RRF     Counter5,1              ;divide by 4
        CLRC
        RRF     Counter5,1

GOTO    FlushSend               ;send it to the remote

RangeAdjust
        BCF     FlagByte,3              ;reset flag bit indicating adjusting
                                        ; range (checked in Incr & Decr)
;       MOVLW   0F7h                    ;reset flag bit indicating adjusting
;       ANDWF   FlagByte,1              ; range (checked in Incr & Decr)

MOVF    Range,W                 ;put current range (0 - 26) in
        MOVWF   Counter5                ; temp register for calculations GOTO    RangeSend               ;send it to the remote TimeAdjust
        BSF     FlagByte,3              ;set flag bit indicating adjusting
                                        ; range (checked in Incr & Decr)
;       MOVLW   08h                     ;set flag bit indicating adjusting
;       IORWF   FlagByte,1              ; time (checked in Incr & Decr)

MOVF    FlushTime,W             ;Get the current Flush Time
```

```
        MOVWF   Counter5              ;Save it in a holder

GOTO    MultipleSend          ;send it to the remote

OUT3    CALL    CWDT2SEC              ;Set WDT timeout for resync jump-out

ReSync  CALL    Wait12m

MOVLW   XMITVAL
        MOVWF   TransVal              ;Set transmitted value
                                      ;We currently send the six LSBs of XMITVAL MOVLW   RemotePresent         ;Set Mask byte to test for a remote
        MOVWF   MaskByte BSF     PortB,RecEn           ;Turn ON the receiver
        CALL    CCheckConfig          ;Check for any changes in the configuration
        CALL    CTakeAPeak            ;See what we can see
        BCF     PortB,RecEn           ;Turn OFF the receiver ANDLW   0FFh                  ;Check if someone is there (FF-y, 00-n)
        SKPNZ
        GOTO    ReSync                ;Skip to keeping track of no one there

GOTO    REMOTE

DaySend
        CALL    CWDT2SEC

MOVLW   80h                   ;24 hr flush flag bit
        XORWF   ManFlushTime,W        ;change it
        MOVWF   ManFlushTime          ;save it
        MOVLW   CurrentTime11         ;assume it's on
        BTFSS   ManFlushTime,7        ;see what current status really is
        MOVLW   CurrentTime10         ;it it's really off StartA  MOVWF   TransVal              ;Set transmitted value MOVLW   05h
        MOVWF   Counter4

AgainA  CALL    Wait12m

BSF     PortB,RecEn           ;Turn ON the receiver
        CALL    CcheckConfig          ;Check for any changes in the configuration
        CALL    CtakeAPeak            ;See what we can see
```

43

```
            BCF    PortB,RecEn          ;Turn OFF the receiver

DECFSZ Counter4,1           ;Send multiple times
            GOTO   AgainA

FlushSend
            CALL   CWDT2SEC

MOVLW  36h                  ;54d
            SUBWF  Counter5,W           ;Subtract for testing
            SKPC                        ;Test for negative
            GOTO   N27

MOVLW  36h                  ;Actually do the subtraction
            SUBWF  Counter5,1

MOVLW  CurrentTime02        ;Set the Byte to transmit
            GOTO   Start0

N27         MOVLW  1Bh                  ;27d
            SUBWF  Counter5,W           ;Subtract for testing
            SKPC                        ;Test for negative
            GOTO   N26

MOVLW  1Bh                  ;Actually do the subtraction
            SUBWF  Counter5,1

MOVLW  CurrentTime01        ;Set the Byte to transmit
            GOTO   Start0

N26         MOVLW  CurrentTime00        ;Set the Byte to transmit

Start0      MOVWF  TransVal             ;Set transmitted value

MOVLW  05h
            MOVWF  Counter4

Again0  CALL   Wait12m

BSF    PortB,RecEn          ;Turn ON the receiver
            CALL   CCheckConfig         ;Check for any changes in the configuration
            CALL   CTakeAPeak           ;See what we can see
            BCF    PortB,RecEn          ;Turn OFF the receiver DECFSZ Counter4,1           ;Send multiple times
            GOTO   Again0
```

```
RangeSend
        CALL    CWDT2SEC

MOVLW   12h                 ;18d
        SUBWF   Counter5,W          ;Subtract for testing
        SKPC                        ;Test for negative
        GOTO    N9

MOVLW   12h                 ;Actually do the subtraction
        SUBWF   Counter5,1

MOVLW   CurrentTime12       ;Set the Byte to transmit
        GOTO    Start1

N9      MOVLW   09h                 ;09d
        SUBWF   Counter5,W          ;Subtract for testing
        SKPC                        ;Test for negative
        GOTO    N8

MOVLW   09h                 ;Actually do the subtraction
        SUBWF   Counter5,1

MOVLW   CurrentTime11       ;Set the Byte to transmit
        GOTO    Start1

N8      MOVLW   CurrentTime10       ;Set the Byte to transmit

Start1  MOVWF   TransVal            ;Set transmitted value

MOVLW   05h
        MOVWF   Counter4

Again1  CALL    Wait12m

BSF     PortB,RecEn         ;Turn ON the receiver
        CALL    CcheckConfig        ;Check for any changes in the configuration
        CALL    CtakeAPeak          ;See what we can see
        BCF     PortB,RecEn         ;Turn OFF the receiver DECFSZ  Counter4,1          ;Send multiple times
        GOTO    Again1

MultipleSend

CALL    CWDT2SEC            ;Set WDT timeout to longest
                                    ; possible time
```

```
        MOVLW   06h             ;06d
        SUBWF   Counter5,W      ;Subtract for testing
        SKPC                    ;Test for negative
        GOTO    N3

MOVLW   06h             ;Actually do the subtraction
        SUBWF   Counter5,1

MOVLW   CurrentTime02   ;Set the Byte to transmit
        GOTO    Start2

N3      MOVLW   03h             ;03d
        SUBWF   Counter5,W      ;Subtract for testing
        SKPC                    ;Test for negative
        GOTO    N2

MOVLW   03h             ;Actually do the subtraction
        SUBWF   Counter5,1

MOVLW   CurrentTime01   ;Set the Byte to transmit
        GOTO    Start2

N2      MOVLW   CurrentTime00   ;Set the Byte to transmit

Start2  MOVWF   TransVal        ;Set transmitted value

MOVLW   05h
        MOVWF   Counter4

Again2  CALL    Wait12m

BSF     PortB,RecEn     ;Turn ON the receiver
        CALL    CCheckConfig    ;Check for any changes in the configuration
        CALL    CTakeAPeak      ;See what we can see
        BCF     PortB,RecEn     ;Turn OFF the receiver DECFSZ  Counter4,1      ;Send multiple times
        GOTO    Again2

Test3   MOVLW   02h             ;02d
        SUBWF   Counter5,W      ;Subtract for testing
        SKPC                    ;Test for negative
        GOTO    N1

MOVLW   02h             ;Actually do the subtraction
        SUBWF   Counter5,1
```

46

```
TSTSND2 MOVLW   CurrentTime12  ;Set the Byte to transmit
        GOTO    Start3

N1      MOVLW   01h                     ;01d
        SUBWF   Counter5,W              ;Subtract for testing
        SKPC                            ;Test for negative
        GOTO    N0

MOVLW   01h                     ;Actually do the subtraction
        SUBWF   Counter5,1

MOVLW   CurrentTime11           ;Set the Byte to transmit
        GOTO    Start3

N0      MOVLW   CurrentTime10           ;Set the Byte to transmit

Start3  MOVWF   TransVal                ;Set transmitted value

MOVLW   05h                     ;send 5 times
        MOVWF   Counter4

LoSend  CALL    CWDT2SEC
        CALL    Wait12m

BSF     PortB,RecEn             ;Turn ON the receiver
        CALL    CCheckConfig            ;Check for any changes in
                                        ;  the configuration
        CALL    CTakeAPeak              ;See what we can see
        BCF     PortB,RecEn             ;Turn OFF the receiver DECFSZ  Counter4,1              ;Send multiple times
        GOTO    LoSend MOVLW   03h
        MOVWF   Counter4

MOVLW   ReadyToReceive          ;now that time is xmitted,
        MOVWF   TransVal                ; let remote know we're
                                        ; ready to receive again
        GOTO    SendMore
```

;----------------------------------------------------------------------
;
;               Range Test Loop - active for two Minutes

```
;
;
;
;   Registers Used: Counter2    4 msec counter
;               Counter3    Small loop counter
;               Counter5    Number of active seconds counter
;               TransVal    Value to be transmitted
;               MaskByte    Mask Byte for Received byte
;
; Subroutines Called: TakeAPeak    Transmit byte
;               Holder
;               Holder2
;               Trash
;               Counter3
;           CheckConfig    Adjust configuration
;               Holder
;               Trash
;               Counter3
;           SetAtoD        Load A/D convertor value
;               Trash
;               Counter3
;
;------------------------------------------------------------------
;
RangeTest  MOVLW   05h              ;Set Range Find time to 120 secs
           MOVWF   Counter5         ;Set outer counter CLRF    Counter2

KeepTruckn MOVLW   XMITVAL          ;Set the Byte to transmit
;          MOVWF   TransVal         ;Store it ;          CALL    CWDT2SEC         ;Set WDT timeout to about 2 secs ;          MOVLW   RemotePresent
;          MOVWF   MaskByte ;          BSF     PortB,RecEn      ;Turn ON the receiver
;          CALL    CCheckConfig     ;Check for any changes in the configuration
;          CALL    CTakeAPeak       ;See what we can see
;          BCF     PortB,RecEn      ;Turn OFF the receiver ;          ANDLW   0FFh             ;See if we saw anything
;          SKPNZ
;          GOTO    OUTOFRANGE       ;Jump if no one there INRANGE    BCF     PortA,LED        ;We saw him/her, turn on the beacon!
```

48

```
        ANDLW   055H            ;See if we saw the REMOTE
        SKPZ
        GOTO    CONT            ;Keep on trucking MOVF    RecPotValue,W   ;Store the old value so the remote will have to be in
range
        MOVWF   Holder3
        MOVLW   20h             ;Put a close value for range
        MOVWF   RecPotValue GOTO    START           ;Jump if REMOTE OUTOFRANGE BSF  PortA,LED       ;No go... Make sure the beacon is off.

;
; -- wait 12 msec
;
CONT    CLRF    Counter3

Loop100 DECF    Counter3,1
        SKPZ
        GOTO    Loop100     ;1 cycle  > 256 * 2 = 512

Loop101 DECF    Counter3,1
        SKPZ
        GOTO    Loop101     ;1 cycle  > 256 * 2 = 512

Loop102 DECF    Counter3,1
        SKPZ
        GOTO    Loop102     ;1 cycle  > 256 * 2 = 512

;
;
;

DECFSZ  Counter2,1    ;Counter for 4 msec
        GOTO    KeepTruckn

DECFSZ  Counter5,1    ;Counter for active seconds
        GOTO    KeepTruckn

OUT     GOTO    EndRangeTest  ;If done, go home

;****************************************************************
;----------------------------------------------------------------
```

49

```
;
;
;    BARRIER OF DEATH ... DEATh ... DEAth ... DEath ... Death ... death
;
;
;---------------------------------------------------------------
;***************************************************************
;
;
      ORG    200h          ;Beginning of Second Page of EPROM ;****************************************************
;
;    28 values used to translate 0 - 27 to settings for digital pot
;    this routine must be located at the beginning of a page
;    if it is moved, IT WILL NOT WORK
;
;****************************************************
;
Convert ;MOVLW  3              ; for 3 words before table in this routine
        ;ADDWF   Range,W       ; if this section is changed, then this
        ;MOVWF   PC            ; value of 3 needs to be changed
;****************************************************
        MOVF     Range,W
        ADDWF    PC,1
        RETLW  06h        ;6 inches
        RETLW  06h
        RETLW  08h
        RETLW  0Bh        ;12 inches
        RETLW  0Eh
        RETLW  12h
        RETLW  16h        ;18 inches
        RETLW  1Ah
        RETLW  1Fh
        RETLW  26h        ;24 inches
        RETLW  2Ch
        RETLW  33h
        RETLW  3Ch        ;30 inches
        RETLW  45h
        RETLW  50h
        RETLW  5Eh        ;36 inches
        RETLW  65h
        RETLW  6Dh
        RETLW  77h        ;42 inches
        RETLW  86h
        RETLW  9Ch
        RETLW  0BDh       ;48 inches
        RETLW  0C8h
```

```
        RETLW   0D8h
        RETLW   0EDh        ;54 inches
        RETLW   0FFh        ;more than 54 inches
        RETLW   0FFh
        RETLW   0FFh ETakeAPeak  BCF     STATUS,05h
            GOTO    RTakeAPeak
FTakeAPeak  BCF     STATUS,05h
            GOTO    STakeAPeak
GTakeAPeak  BCF     STATUS,05h
            GOTO    TTakeAPeak CSetAtoD    BSF     STATUS,05h
            GOTO    SetAtoD RCheckConfig BCF    STATUS,05h
            RETLW   00h ;****************************************************************
;
;---------------------------------------------------------------
;
;               SUBROUTINES
;
;---------------------------------------------------------------
;****************************************************************
;

;---------------------------------------------------------------
;
;               Watch Dog Timer
;
;---------------------------------------------------------------
;
WDT2SEC MOVLW   b'00001111'   ;Set Prescaler to WDT for 1:128
        CLRWDT                ;Clear WDT
        OPTION                ;Save Prescaler
        BCF     STATUS,05h
        RETLW   00h WDT1SEC MOVLW   b'00001110'   ;Set Prescaler to WDT for 1:64
        CLRWDT                ;Clear WDT
        OPTION                ;Save Prescaler
        BCF     STATUS,05h
        RETLW   00h
```

```
;----------------------------------------------------------------
;
;               CheckConfig
;
;
;   Registers Used: Holder      Current Manual Flush time setting
;                               AND holder for RecPotValue during Init
;                   ManFlushTime   Last Manual Flush time setting
;                   FlushTime      Actual Flush Time Used
;                   RecPotValue    Actual Receiver Gain setting
;                   ManADValue     Last Manual Pot setting
;                   AtoDValue      Test Byte for A to D Conversion
;                   Inverse        Low Byte Equivalent of AtoDValue
;                   NumOfBits      Number of bits tested
;                   Trash          Holder for transfering Inverse to AtoDValue
;                   Counter3       Loop for above bit transfer
;                                  AND Small Wait Loop
;
;----------------------------------------------------------------

CheckConfig

MOVF    RecPotValue,W   ;Store the old value so we can ramp faster
        MOVWF   Holder
        CLRF    RecPotValue     ;Clear out the old value MOVF    ManADValue,W    ;Check above old value
        MOVWF   AtoDValue
        MOVLW   03h             ;Check upper range
        ADDWF   AtoDValue CALL    CSetAtoD MOVF    ManADValue,W    ;Check above old value
        MOVWF   AtoDValue
        MOVLW   03h             ;Check upper range
        ADDWF   AtoDValue SKPNC
        GOTO    MaxedOut        ;Skip test if close to upper limit MOVLW   PotConfig
        ANDWF   PortB,W         ;Get the Receive bit SKPNZ
        GOTO    Configure
```

```
MaxedOut
        MOVF    Holder,W       ;Get the stored, old value
        MOVWF   RecPotValue    ;Put it back in MOVF    ManADValue,W
        MOVWF   AtoDValue
        MOVLW   06h            ;are we already at minimum allowed
        SUBWF   AtoDValue SKPNZ
        GOTO    SamePot        ;return if so MOVF    ManADValue,W   ;Check below old value
        MOVWF   AtoDValue
        MOVLW   03h            ;Check lower range
        SUBWF   AtoDValue CALL    CSetAtoD MOVF    ManADValue,W   ;Check above old value
        MOVWF   AtoDValue
        MOVLW   03h            ;Check upper range
        SUBWF   AtoDValue SKPC
        GOTO    RCheckConfig MOVLW   PotConfig
        ANDWF   PortB,W        ;Get the Receive bit SKPNZ
        GOTO    RCheckConfig Configure CLRF  Inverse
        CLRF    AtoDValue BSF     AtoDValue,07h
        BSF     Inverse,00h MOVLW   01h
        MOVWF   NumOfBits NextBit CALL    CSetAtoD MOVLW   PotConfig
        ANDWF   PortB,W        ;Get the Receive bit
```

```
        SKPZ
        BCF    Inverse,00h

RLF    Inverse,1
        BSF    Inverse,00h

CLRF   AtoDValue
        MOVF   Inverse,W
        MOVWF  Trash
        INCF   NumOfBits,1
        MOVF   NumOfBits,W
        MOVWF  Counter3

Shift   RRF    Trash
        RRF    AtoDValue

DECFSZ Counter3,1

GOTO   Shift

MOVLW  08h
        ANDWF  NumOfBits,W

SKPNZ
        GOTO   NextBit

CALL   CSetAtoD

MOVLW  PotConfig
        ANDWF  PortB,W        ;Get the Receive bit

SKPZ
        BCF    AtoDValue,00h

MOVF   Holder,W       ;Get the stored, old value
        MOVWF  RecPotValue    ;Put it back in MOVF   AtoDValue,W    ;Ready to check against current setting
        SUBWF  ManADValue,W   ;Figure out if the setting is any different SKPNZ
        GOTO   SamePot        ;Skip if Same Pot setting MOVLW  06h            ;minimum value allowed
        SUBWF  AtoDValue,W    ;compare & adust carry flag as necessary
        MOVLW  06h            ;assume pot is below min.
                              ; (doesn't affect carry flag)
```

54

```
        SKPNC              ;skip if so
        MOVF    AtoDValue,W ; Recall the physical setting if not MOVWF   RecPotValue ;Save it as the current setting
        MOVWF   ManADValue  ;Save it as the current setting ;   now we find what Range value we use with the initial
;   Receiver Pot setting by comparing with the values in
;   the table set up as a subroutine CLRF    Range       ;start with 0

ValFind
        CALL    Convert     ;get pot setting for this Range

INCF    Range,1     ;assume we're going to have to try again
        SUBWF   RecPotValue,W ;compare table value to pot setting
        SKPNZ               ;skip if not equal
        GOTO    FoundIt
        SKPNC               ;skip if table value is greater
        GOTO    ValFind     ;loop until we find a greater table value FoundIt DECF   Range,1      ;go back one since we assumed wrong last time SamePot CALL   CSetAtoD GOTO    RCheckConfig ;-----------------------------------------------------------------
;
;               CheckBat
;
;
;   Registers Used: AtoDValue    Test Byte for A to D Conversion
;                   Counter3     Small Wait Loop
;
;
;-----------------------------------------------------------------

CCheckBat

MOVLW   GoodVoltage ;Check if voltage is above Good Level
        MOVWF   AtoDValue CALL    CSetAtoD MOVLW   BatConfig
```

```
        ANDWF   PortB,W         ;Get the Receive bit

SKPZ                    ;See if the voltage is higher than us
        GOTO    Fair1

MOVLW   BatteryGood
        MOVWF   Battery         ;Looks GOOD
        GOTO    EndBat1

Fair1   MOVLW   FairVoltage     ;Check above old value
        MOVWF   AtoDValue CALL    CSetAtoD MOVLW   BatConfig
        ANDWF   PortB,W         ;Get the Receive bit SKPZ                    ;See if the voltage is higher than us
        GOTO    Dead1

MOVLW   BatteryWeak     ;Looks FAIR
        MOVWF   Battery
        GOTO    EndBat1

Dead1   MOVLW   BatteryBad      ;Looks ABOUT DEAD
        MOVWF   Battery

EndBat1 BCF     STATUS,05h
        RETLW   00h

;---------------------------------------------------------------
;
;               SetAtoD
;
;
;       Registers Used: AtoDValue    Value to send to A to D Digital Pot
;                       RecPotValue  Value to send to Rec Gain Digital Pot
;                       Trash        Equiv of RecPotValue and AtoDValue
;                                    for bit shifting
;                       Counter3     Number of bits to send loop
;                                    AND Wait loop
;
;       CAN NOT ALTER: Holder        Holder for RecPotValue
;                      NumOfBits     Counter of bits tested in CheckConfig
;                      AtoDValue
;                      RecPotValue
;
```

```
;------------------------------------------------------------------------

SetAtoD  MOVLW   ADWriteB        ;Set the eight B Ports
         TRIS    PortB

MOVF    RecPotValue,W   ;Store it
         MOVWF   Trash           ;Store it

BSF     PortB,PotEn     ;Tell the Digital Pot to Accept info

BSF     PortB,DATvDQ    ;Set the bit to One if correct

BSF     PortB,POTvCLK   ;Tell the D/A to accept the bit
         BCF     PortB,POTvCLK   ;

MOVLW   08h             ;Set number of serial bits
         MOVWF   Counter3        ;Store the counter AtoDBit1 BCF     PortB,DATvDQ    ;Assume the next bit is a zero
         RLF     Trash,1         ;Get the next bit
         SKPNC                   ;Skip bit set if it is supposed to be a zero BSF     PortB,DATvDQ    ;Set the bit to One if correct BSF     PortB,POTvCLK   ;Tell the D/A to accept the bit
         BCF     PortB,POTvCLK   ;

DECFSZ  Counter3,1      ;Count down number of bits sent

GOTO    AtoDBit1

MOVF    AtoDValue,W     ;Store it
         MOVWF   Trash           ;Store it

MOVLW   08h             ;Set number of serial bits
         MOVWF   Counter3        ;Store the counter AtoDBit2 BCF     PortB,DATvDQ    ;Assume the next bit is a zero
         RLF     Trash,1         ;Get the next bit
         SKPNC                   ;Skip bit set if it is supposed to be a zero BSF     PortB,DATvDQ    ;Set the bit to One if correct BSF     PortB,POTvCLK   ;Tell the D/A to accept the bit
         BCF     PortB,POTvCLK   ;

DECFSZ  Counter3,1      ;Count down number of bits sent
```

```
        GOTO    AtoDBit2

BCF     PortB,PotEn     ;Tell the Digital Pot to Stop Accepting info

NOP
        NOP

MOVLW   ADReadB         ;Set the eight B Ports
        TRIS    PortB

;
; -- wait 250 usec, then start conversion
;

MOVLW   10h             ;250 usec at 800kHz
        MOVWF   Counter3

Loop3   DECF    Counter3,1      ;1 cycle \---------------\
        SKPZ
        GOTO    Loop3           ;1 cycle  > 256 * 2 = 512  \
                                ;       /           > 514 cycles RETLW   00h ;----------------------------------------------------------------
;
;       index for counter for flush times
;       input the flush time switch setting (0-7) in W
;       returns the number to count down for the desired
;           amount of time in W
;
;----------------------------------------------------------------
FlushIndex
        ADDWF   PC,1
        RETLW   22              ;0=810ms
        RETLW   26              ;1=890ms
        RETLW   32              ;2=1160ms
        RETLW   39              ;3=1320ms
        RETLW   56              ;4=1960ms
        RETLW   61              ;5=2200ms
        RETLW   67              ;6=2320ms
        RETLW   74              ;7=2600ms

;----------------------------------------------------------------
```

```
;                   FLUSH
;
;
;    Registers Used: FlushTime   Current flush time value
;                    Trash       Equiv of FlushTime for decrementing
;                    Holder      1 second counter
;                    Counter3    msec Wait loop
;
; do the solenoid -- turn it on full for 30 msec
;                 -- pwm at 30% (300 usec on/700 off)
;
; delay for solenoid -- 30 msec (12000 cycles @ 800 KHz)
;
;-----------------------------------------------------------------

CFLUSH
        MOVLW   OneDay          ;count of 78 for 24 hrs.
        MOVWF   Counter2        ;save it BTFSC   ManFlushTime,6  ;don't flush if flag bit set for voltage too low
        GOTO    EndFlush INCF    FlushCntLSB,1   ;increment 2 byte flush counter
        SKPNZ                   ;skip if no overflow
        INCF    FlushCntMSB,1

CALL    WDT2SEC         ;   Set WDT timeout to about 2 secs
        BSF     STATUS,05h BSF     PortB,Flush     ;Turn ON flush bit ;
;  BATTERY TEST
;
        BSF     PortB,RecEn     ;Turn ON the receiver to DtoA MOVLW   GoodVoltage     ;Check if voltage is above Good Level
        MOVWF   AtoDValue CALL    CSetAtoD ;
;  WAIT 50 msec
;
        MOVLW   0ah             ;50 msec at 800kHz
        MOVWF   Holder
```

```
        CLRF    Counter3

Loop6   DECF    Counter3,1
        SKPZ
        GOTO    Loop6

DECF    Holder,1
        SKPZ
        GOTO    Loop6

;
; END 50 msec delay
;

MOVLW   BatConfig
        ANDWF   PortB,W     ;Get the Receive bit

SKPZ                ;See if the voltage is higher than us
        GOTO    Fair

MOVLW   BatteryGood
        MOVWF   Battery     ;Looks GOOD
        GOTO    EndBat Fair    MOVLW   FairVoltage ;Check above old value
        MOVWF   AtoDValue CALL    CSetAtoD MOVLW   BatConfig
        ANDWF   PortB,W     ;Get the Receive bit SKPZ                ;See if the voltage is higher than us
        GOTO    Bad MOVLW   BatteryWeak ;Looks FAIR
        MOVWF   Battery
        GOTO    EndBat Bad     MOVLW   BadVoltage  ;Check above old value
        MOVWF   AtoDValue CALL    CSetAtoD MOVLW   BatConfig
```

```
        ANDWF   PortB,W      ;Get the Receive bit

SKPZ                 ;See if the voltage is higher than us
        BSF     ManFlushTime,6   ;Set flag to say voltage too low to flush Dead    MOVLW   BatteryBad   ;Looks ABOUT DEAD
        MOVWF   Battery EndBat  BCF     PortB,RecEn  ;Turn OFF the receiver to DtoA MOVF    FlushTime,W  ;Get the current flush time CALL    FlushIndex MOVWF   Trash        ;save FlushTime PWMloop MOVLW   03h          ;Outer loop = .067 sec
        MOVWF   Holder CALL    WDT2SEC      ;Set WDT timeout to about 2 secs
        BSF     STATUS,05h CLRF    Counter3     ;Inner loop = .00896sec ;**************  33  *****************
FTurn   BSF     PortB,Flush  ;Turn ON the solenoid

NOP

BCF     PortB,Flush  ;Turn OFF the solenoid

DECFSZ  Counter3,1   ;Count down for .00896sec loop
        GOTO    FTurn

DECFSZ  Holder,1     ;Count down for .5 sec loop
        GOTO    FTurn        ;

DECFSZ  Trash,1      ;Count down flush value in half seconds
        GOTO    PWMloop      ;

BCF     PortB,Flush  ;turn off solenoid

EndFlush
        BCF     STATUS,05h ;Go back to first page
        RETLW   00h
```

```
;----------------------------------------------------------------
;
;               Take A Peak
;
;
;       Registers Used: TransVal       Transmitted Value
;                       NumOfBits      Num of bits to transmit
;                       STATUS (Carry) Counter for send initial 2 bits
;                       Holder         Catch of ON-time Receive
;                       Holder2        Catch of OFF-time Receive
;                       Trash          Valid Catch register
;                       { Test2 (A)    ON-Time Catch light }
;                       { Test1 (A)    OFF-Time Catch light }
;                       RecByte        Returned Info
;                       MaskByte       RecByte Mask for 0AAh Return
;                       Counter3       Holder for TransVal for bit shifting
;
;
;----------------------------------------------------------------
;
TakeAPeak MOVF    PortB,W         ;read switch setting
        ANDLW   FlushTimeBMask
        MOVWF   Holder          ;Put settings in a temp location MOVF    PortA,W         ;read switch setting
        MOVWF   Trash
        BTFSS   Trash,1         ;is the MSB of the switch set, skip if so
        GOTO    LessThan8       ;if not, we know number is 0-7

MOVLW   FlushTimeMask   ;load in the value for switch setting 7
        MOVWF   Holder          ;put it where it should be
        GOTO    MoreThan7

LessThan8
        ANDLW   FlushTimeAMask
        ADDWF   Holder,1        ;Put settings in a temp location MoreThan7
        MOVF    ManFlushTime,W
        ANDLW   3Fh             ;strip off 24hr flush flag bit & don't flush bit
        SUBWF   Holder,W        ;Find out if the manual setting has changed
        SKPNZ
        GOTO    KeepOnGoing MOVLW   0C0h
```

```
        ANDWF   ManFlushTime,1    ;strip out all but 24 hr flush flag & don't flush bit
        MOVF    Holder,W    ;Recall the physical setting
        IORWF   ManFlushTime,1 ;Save it as the last physical setting CLRF    FlushTime
;       COMF    Holder,W    ;Compliment the physical setting
        ANDLW   FlushTimeMask
        SKPNZ
        GOTO    KeepOnGoing MOVWF   Holder ANDLW   FlushTime4Mask
        SKPNZ
        GOTO    NotFour MOVLW   04h
        ADDWF   FlushTime,1

NotFour MOVF    Holder,W
        ANDLW   FlushTime2Mask
        SKPNZ
        GOTO    NotTwo MOVLW   02h
        ADDWF   FlushTime,1

NotTwo  MOVF    Holder,W
        ANDLW   FlushTime1Mask
        SKPNZ
        GOTO    KeepOnGoing MOVLW   01h
        ADDWF   FlushTime,1

KeepOnGoing BCF    PortB,Trans    ;Make sure that the transmitter is off

MOVLW   06h         ;Set Num of trans/rec to 6
        MOVWF   NumOfBits

MOVF    TransVal,W    ;Save TransVal for multiple Peaks
        MOVWF   Counter3

RLF     TransVal,1
        RLF     TransVal,1

CLRF    RecByte     ;Clear the receiving area
```

```
        BSF    STATUS,00h    ;Use the carry bit to loop twice

SENDTWO BSF    PortB,Trans   ;value to send = 1

NOP                  ;30microsecs at 800kHz
        NOP

MOVF   PortA,W

BCF    PortB,Trans   ;value to send = 0

MOVWF  Holder        ;Store the received byte
        MOVF   PortA,W       ;See if someone is sending late
        MOVWF  Holder2       ;Store the received byte ANDWF  Holder,W      ;Mix them together
        MOVWF  Trash MOVLW  IRRecBin      ;Set up for masking
        ANDWF  Trash,1
        SKPZ
        GOTO   NotVer ANDWF  Holder,1      ;65 usec after txd
        SKPNZ
        NOP

SKPZ
        NOP

NOP

ANDWF  Holder2,1
        SKPNZ
        NOP

SKPZ
        NOP

NOP

NOP                  ;Extra NOP for remote
        NOP                  ;Extra NOP for remote
        NOP                  ;Extra NOP for remote BTFSS  PortA,IRRec   ;skip out if do not match (got 0)
        GOTO   NotVer
```

```
            NOP                     ;Space holder for even pulses
            SKPC
            GOTO    SENDALL         ;Dec. trans/rec count and skip if done BCF     STATUS,00h      ;Decrement carry counter
            GOTO    SENDTWO         ;Send the next bit SENDALL     RLF     TransVal,1      ;Get the next bit
            SKPC
            GOTO    NOCARRY         ;Branch if a 0

CARRY       BSF     PortB,Trans     ;value to send = 1

NOP                     ;30microsecs at 800kHz
            NOP

MOVF    PortA,W

BCF     PortB,Trans     ;Value to send = 0

MOVWF   Holder          ;Store the received byte
            MOVF    PortA,W         ;See if someone is sending late
            MOVWF   Holder2         ;Store the received byte ANDWF   Holder,W        ;Mix them together
            MOVWF   Trash MOVLW   IRRecBin        ;Set up for masking
            ANDWF   Trash,1

NOP

ANDWF   Holder,1        ;65 usec after txd
            SKPNZ
            NOP

SKPZ
            NOP

NOP

ANDWF   Holder2,1
            SKPNZ
            NOP

SKPZ
            NOP
```

```
        NOP

RLF     RecByte              ;   -Shift RecByte for next bit
        BSF     RecByte,00h          ;   -Set it for place holder
        NOP                          ;Extra NOP for remote BTFSS   PortA,IRRec          ;Skip out if do not match (got 0)
        GOTO    NotVer DECFSZ  NumOfBits,1          ;Dec. trans/rec count and skip if done
        GOTO    SENDALL              ;Send the next bit

GOTO    OUT2

NOCARRY NOP                          ;Space holders
        MOVF    PortA,W              ;Get an intial response ANDWF   Holder,1
        MOVF    PortA,W
        ANDWF   Holder,1
        MOVF    PortA,W
        NOP MOVWF   Holder               ;Store the received byte
        MOVF    PortA,W              ;See if someone is sending late
        MOVWF   Holder2              ;Store the received byte ANDWF   Holder,W             ;Mix them together
        MOVWF   Trash RLF     RecByte              ;   -Shift RecByte for next bit
        BCF     RecByte,00h          ;   -Clear it out MOVLW   IRRecBin             ;Set up for masking
        ANDWF   Trash,1
        SKPNZ
        BSF     RecByte,00h          ;Set the bit if we got it

SKPZ
        NOP

ANDWF   Holder,1             ;65 usec after txd
        NOP
        NOP

ANDWF   Holder2,1
        SKPNZ
```

```
        NOP

SKPZ
        NOP

BTFSS  PortA,IRRec      ;Skip out if do not match (got 0)
        GOTO   NotVer

DECFSZ NumOfBits,1      ;Dec. trans/rec count and skip if done
        GOTO   SENDALL          ;Send the next bit
;
; end of transmit/receive loop
;

OUT2    BCF    PortB,Trans      ;Make sure that the transmitter is off

MOVF   Counter3,W       ;Recall TransVal for multiple Peaks
        MOVWF  TransVal MOVLW  Normal           ;Test for got OKAY
        SUBWF  RecByte,W
        SKPNZ
        GOTO   FTakeAPeak       ;Go Back if OKAY MOVF   MaskByte,1
        SKPNZ
        GOTO   SkipTest MOVF   MaskByte,W       ;Test for Remote
        SUBWF  RecByte,W
        SKPZ
        GOTO   ETakeAPeak       ;Go Back if no Remote SkipTest GOTO  GTakeAPeak       ;WE GOT IT!!!

NotVer  BCF    PortB,Trans      ;Make sure that the transmitter is off

MOVF   Counter3,W       ;Recall TransVal for multiple Peaks
        MOVWF  TransVal GOTO   ETakeAPeak

END
```

The Impulse sensor is a battery powered, micro controller based circuit that makes use of infrared light to detect the presence of an individual in front of a water closet or urinal. Once an individual using the facility has been detected for a few seconds, the circuit will wait until the person leaves and then automatically operate an electric solenoid valve to flush the water closet or urinal.

Figure 10A:
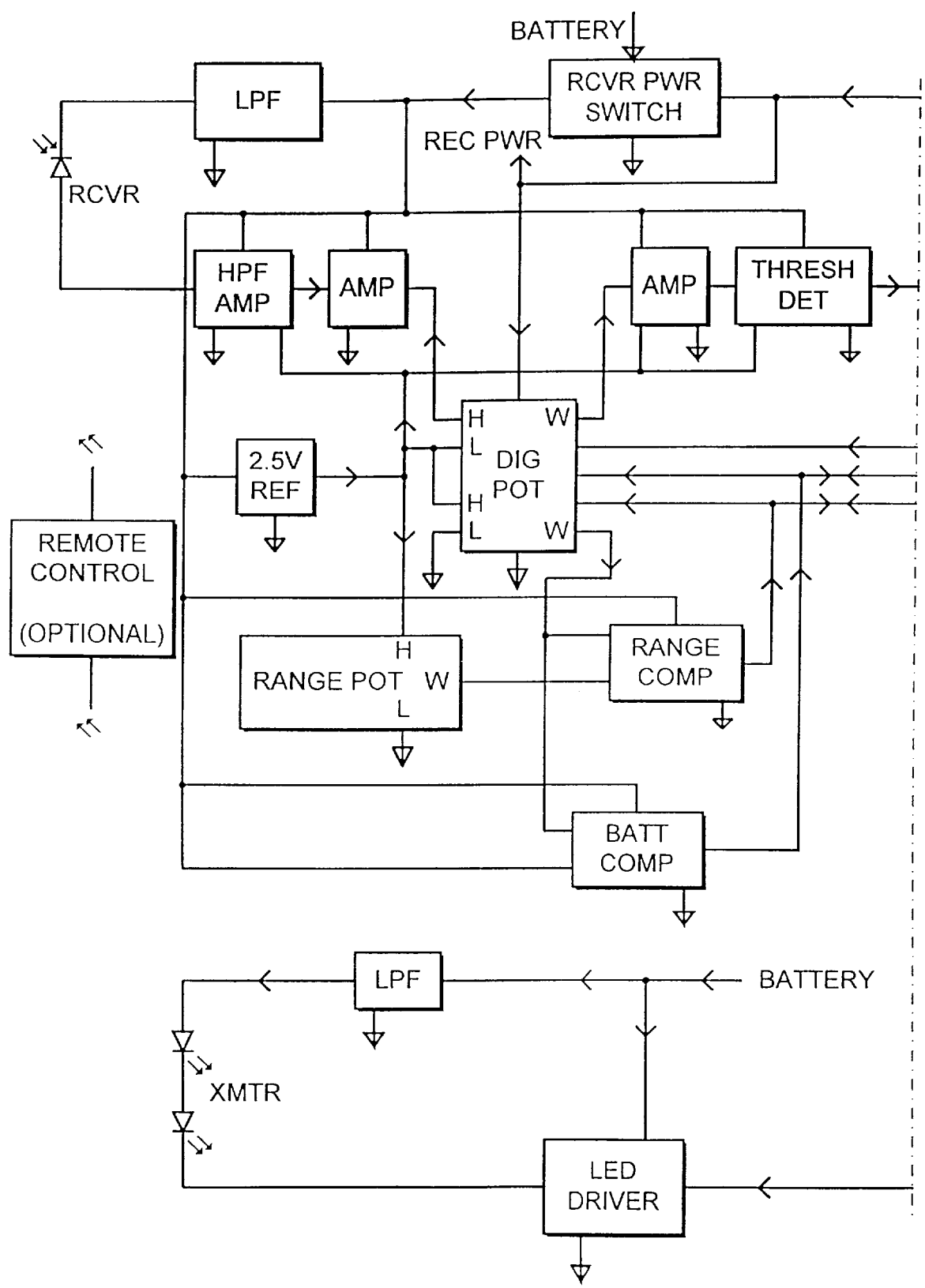
FIG. 10A and FIG. 10B, is a functional block diagram of the impulse sensor according to another embodiment of the invention.
Figure 10B:
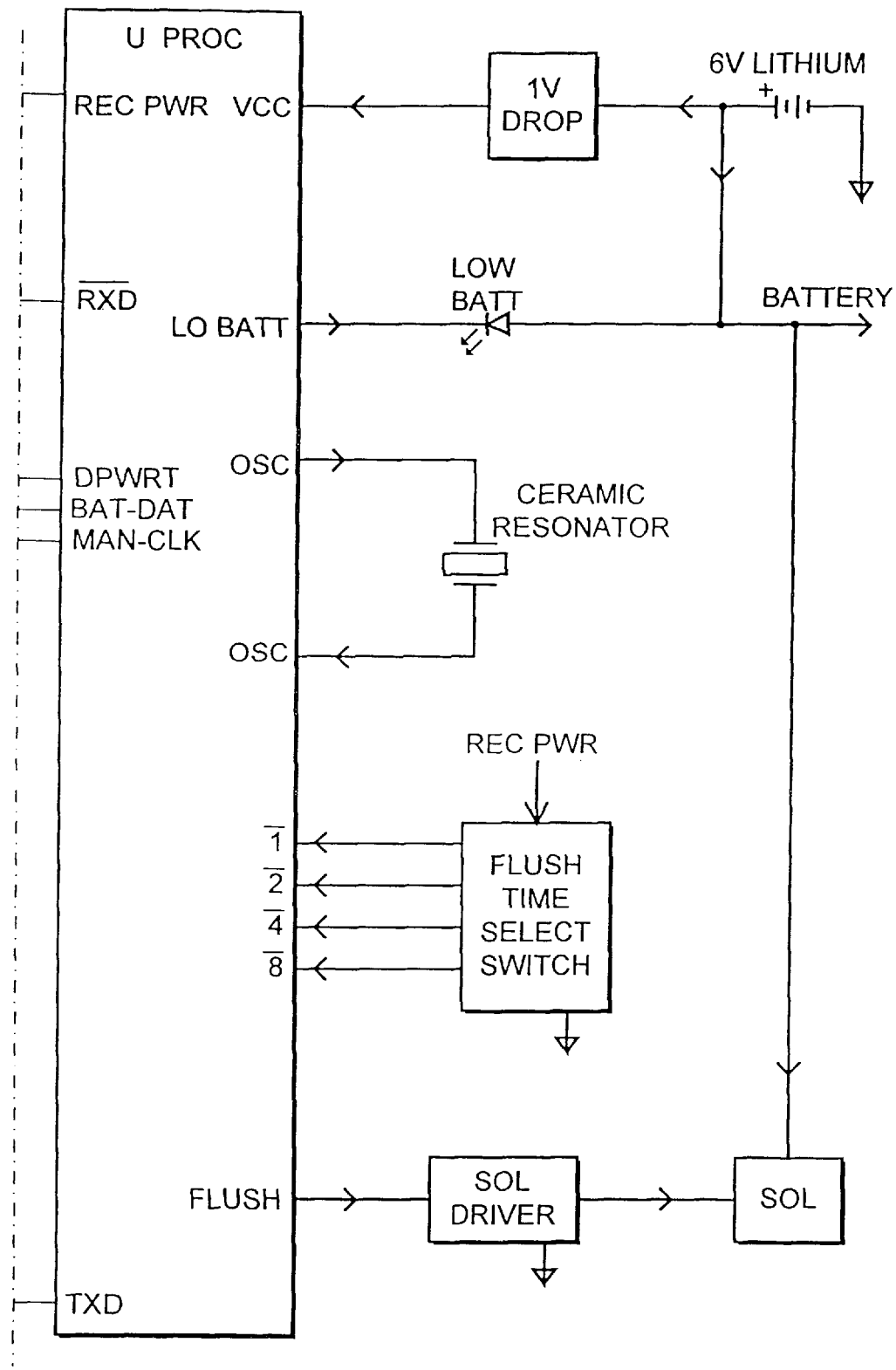
Figure 11A:
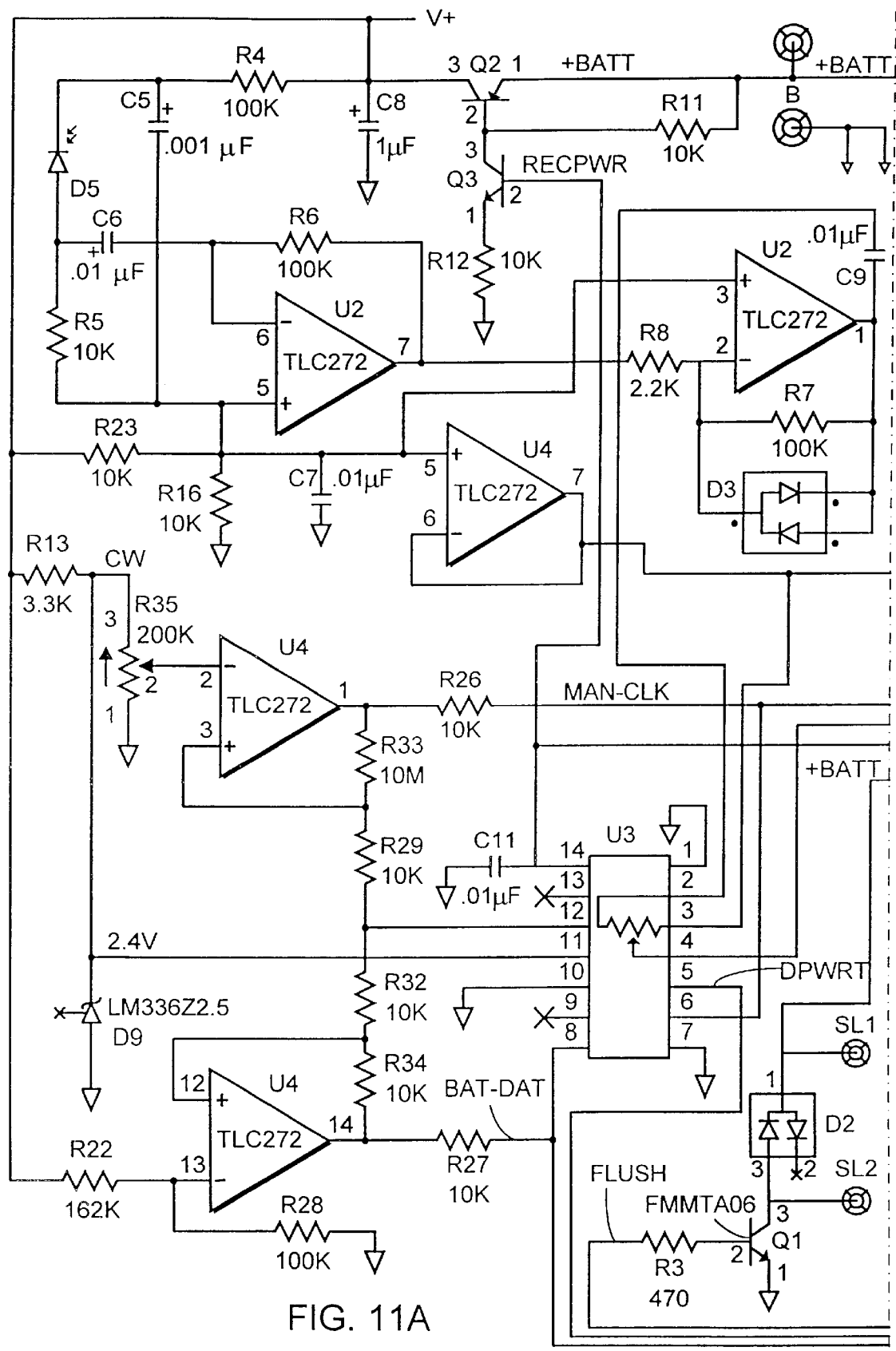
FIG. 11A and FIG. 11B, is a schematic circuit diagram of the details of every component in the FIG. 10 embodiment.
Figure 11B:
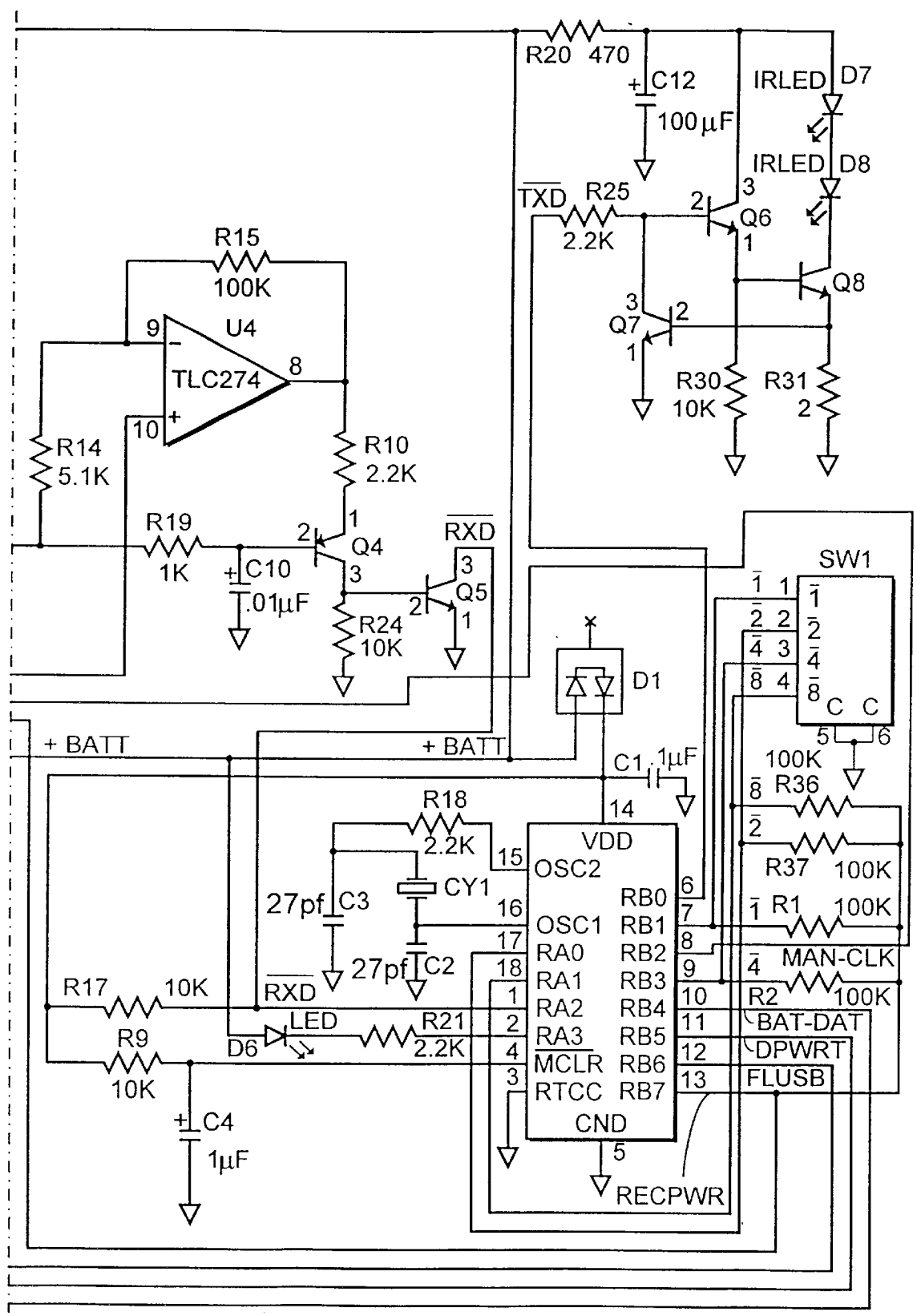

The Impulse sensor circuit, further detailed in the block diagram FIG. 10 and schematic diagram FIG. 11 uses infrared light emitting diodes (IRLED's) to send out pulses of light energy. The amount of energy is controlled by a current regulating circuit so that the output power of the IRLEDs remains constant throughout the life of the battery. This infrared light is reflected off of an individual or object back to the Impulse sensor where it strikes a photo diode that is especially sensitive to light in the infrared area of the spectrum. The current that develops across this photo diode is amplified by several stages of operational amplifiers (OP-AMPS). The train of pulses created through this amplification is recognized by the micro controller as the presence of an individual or object. The distance at which an object can be detected is controlled in the final stage of the amplifiers. A digital potentiometer in the circuit outputs a voltage that is used to determine the amplitude of the reflected signal. This setting, or "range", can be set by the installer of the device by adjusting a single turn potentiometer located inside the Impulse unit. Usable range of the unit can be from twelve to fifty-two inches. The amount of time that the Impulse unit will operate the solenoid is determined by setting a binary coded decimal switch that is connected to the inputs of the micro controller. Flush times can be varied from eight hundred milliseconds to two and one half seconds. The six volt lithium battery provides reliable operation through tens of thousands of flushes. Normal operation includes a sentinel flush every twenty-four hours for sanitary purposes. A visible light on the front of the Impulse unit will illuminate once the micro controller has detected that the battery level has dropped to a point that the battery should be replaced.

Figure 12A:
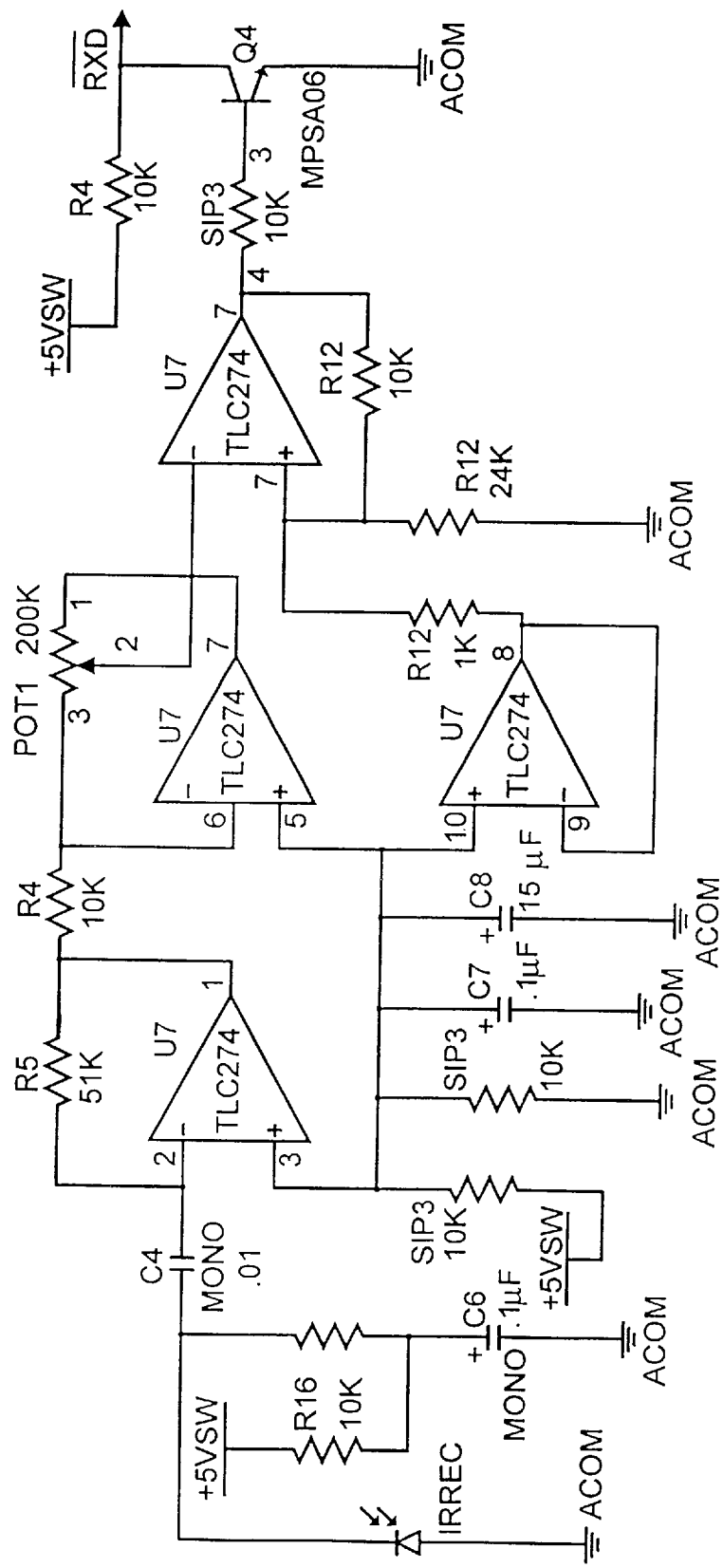
FIG. 12A, FIG. 12B and FIG. 12C, is a circuit diagram of the embodiment shown in FIG. 10 specifically illustrating the transmitter and receiver.
Figure 12B:
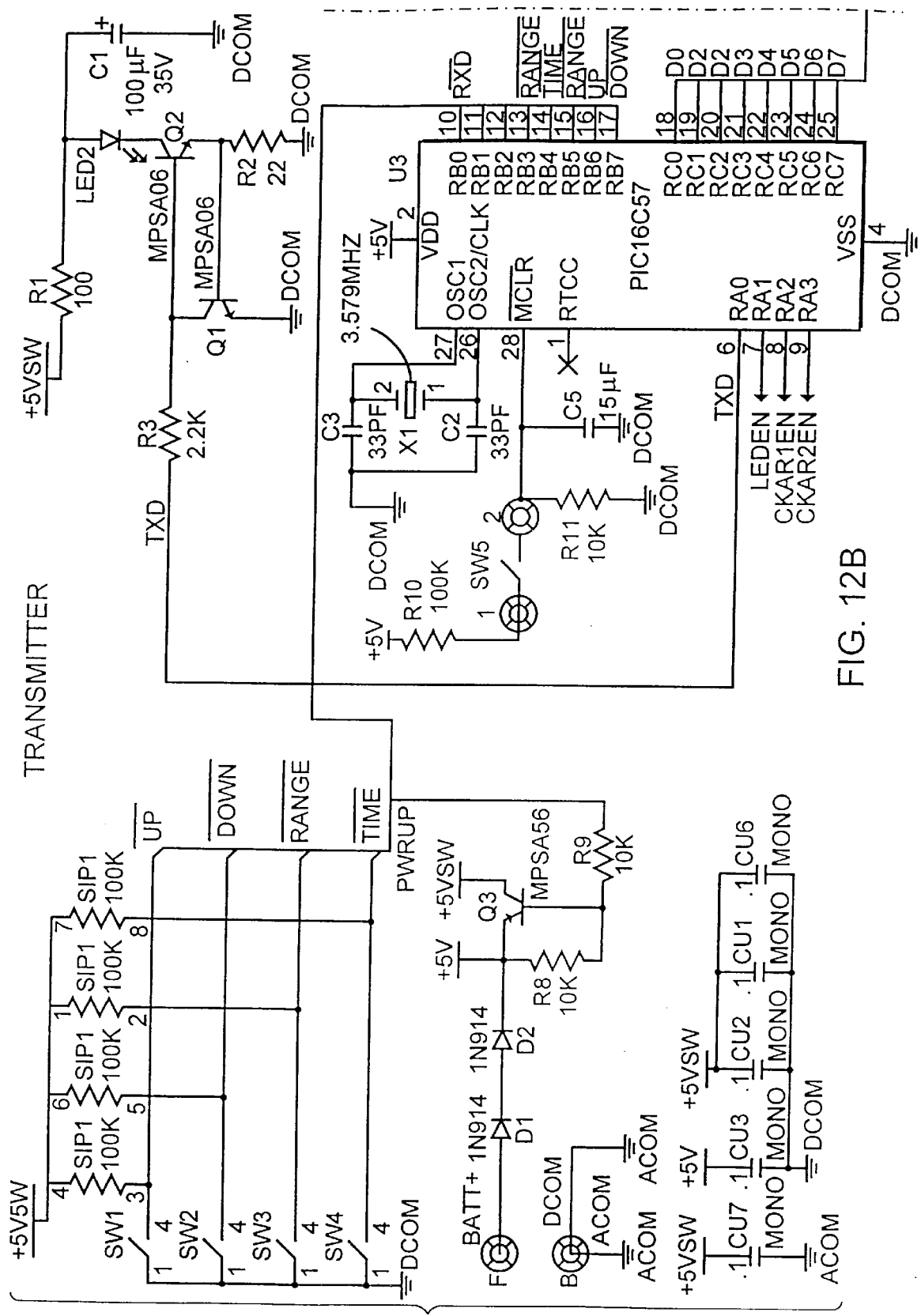
Figure 12C:
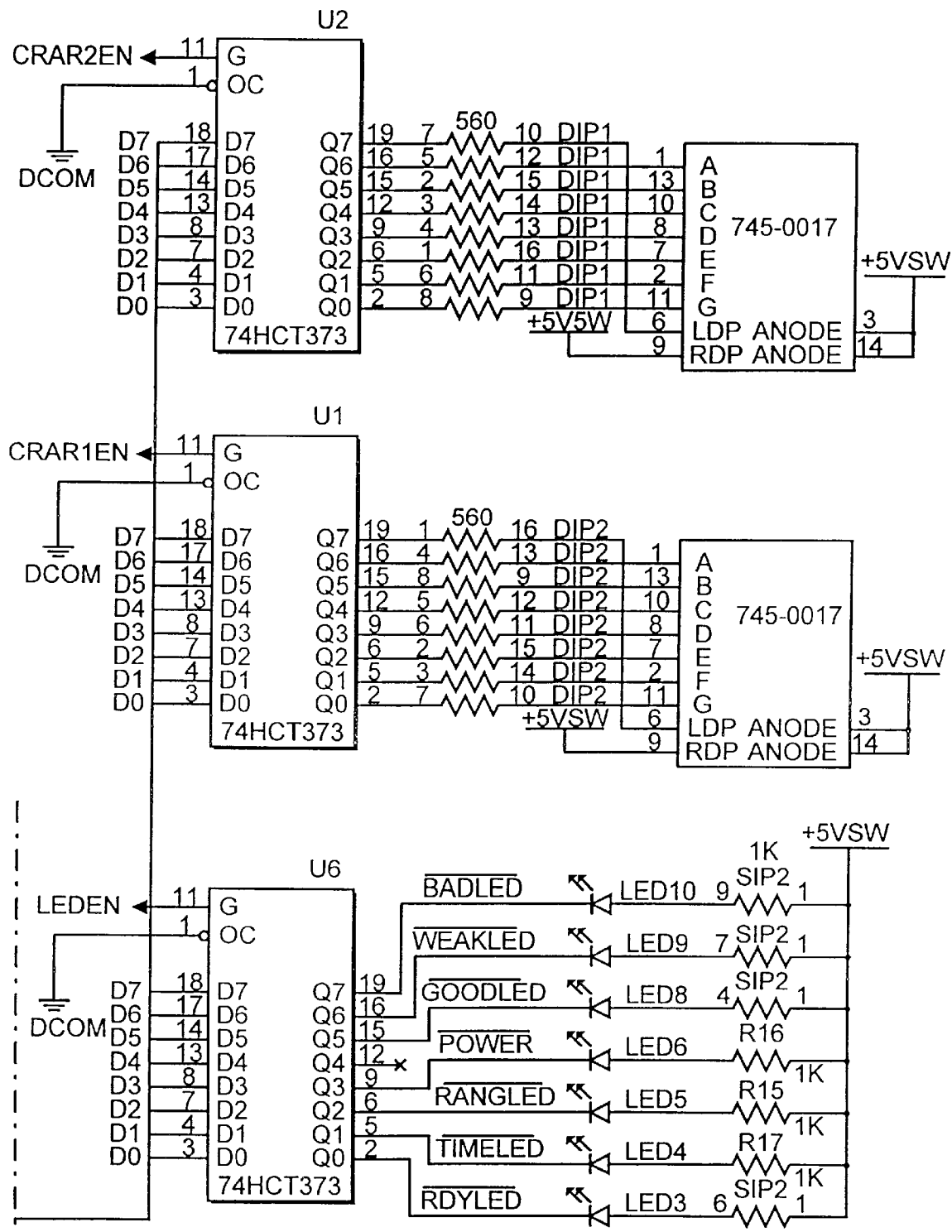
Figure 13:
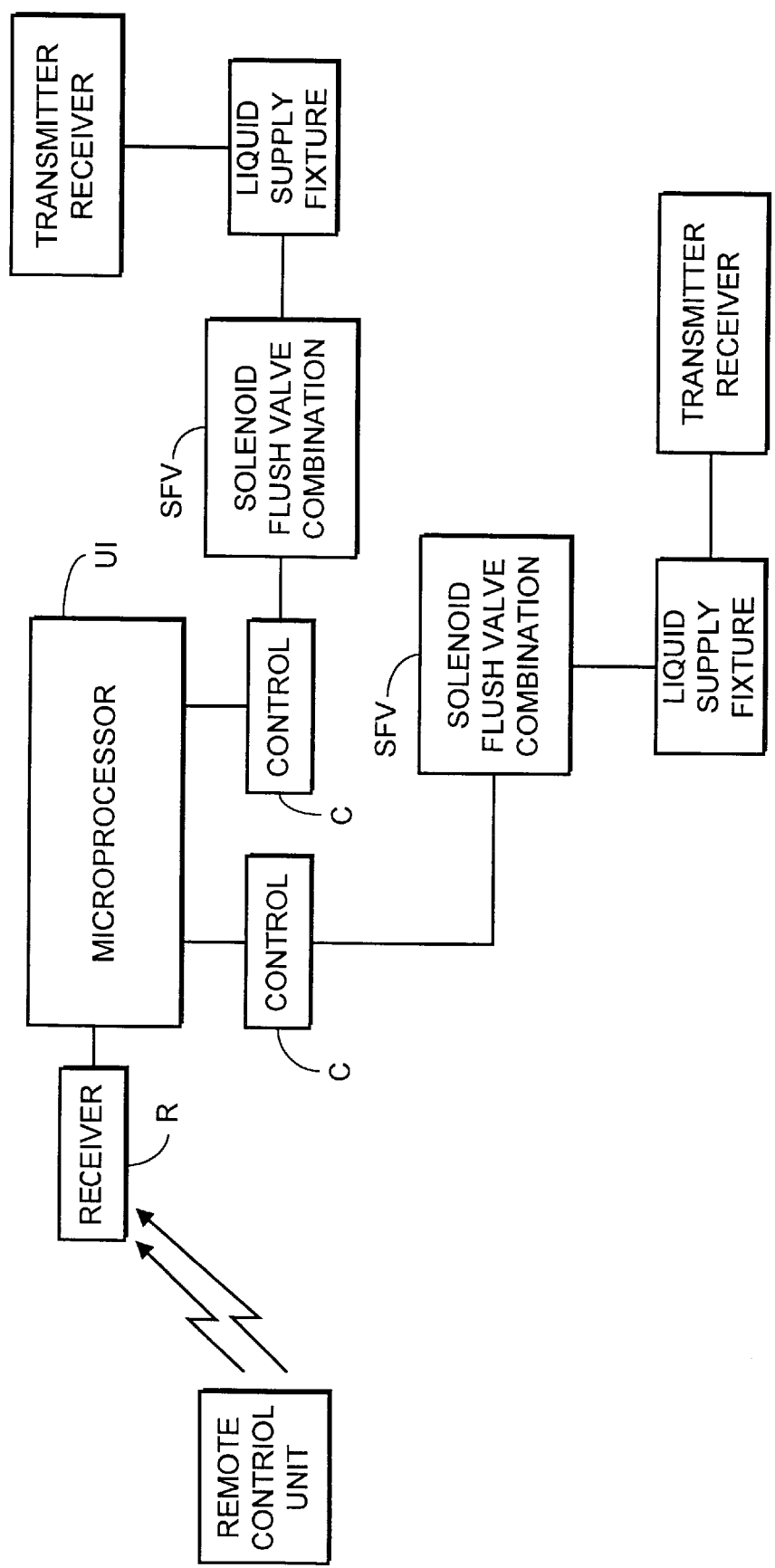
FIG. 13 discloses a portable remote controlling instrument together with a receiver connected to the impulse sensor of FIGS. 1 or 2.

FIG. 12 is the schematic diagram of the circuit for the remote control unit which can be used in conjunction with the Impulse sensor for range and dwell adjustments.

As is clearly understood from the foregoing description, the present invention is concerned with a control system for a liquid supply fixture such as a urinal and comprises the microprocessor U1 which is responsive to signals both from a remote unit as well as from a transmitter-receiver unit associated with the liquid supply fixture and a solenoid valve which is used to control the liquid supply fixture whether in response to the transmitter-receiver associated with the liquid supply fixture or responsive to signals from the microprocessor, as well as from a remote control unit. The microprocessor which is connected to receive inputs continuously from a plurality of sources and also continuously has inputs supplied thereto to provide outputs to a plurality of receivers such as the solenoid valve which controls the liquid supply fixture to control the supply of liquid supplied by the fixture. These liquid supply fixtures can be operated both independently in response to a transmitter-receiver associated with the fixture or in response to an outside control source supplied to the microprocessor which in turn controls the liquid supply fixture. The microprocessor is programmed to receive inputs having a preselected digital code which can be transmitted from the plurality of sources with the preselected digital code so that only one source would be effective to control the microprocessor.

We claim:

1. A control system for a liquid supply fixture, comprising:

a microprocessor connected to receive inputs continuously from a plurality of sources continuously supplying inputs to said microprocessor and to provide outputs to a plurality of receivers for control of the supply of liquid by said fixture, and said microprocessor being programmed to receive inputs having a preselected digital code, transmitted from the plurality of sources with said preselected digital code; and a collection of inputs receivable by said microprocessor from the plurality of sources activated in response to infrared rays received after transmission from an infrared transmission device associated with said microprocessor for activation of means for activation of a control to supply the liquid to said fixture solely in response to infrared rays received after transmission from said infrared transmission device;

wherein said microprocessor is configured to control a solenoid valve.

2. The control system as claimed in claim 1, wherein said preselected digital code is a digital security code transmitted to said microprocessor for controlling the activation thereof.

3. The control system as claimed in claim 1, wherein the system has an operating mode and a non-operating mode, and said electrical supply means includes a battery, battery saver means coupled with said microprocessor, and means coupled with said microprocessor and said battery for deactivation thereof when the system is in its non-operating mode to prolong the life of the battery.

4. The control system as claimed in claim 1, including a remote unit to adjust the operating parameters of said microprocessor.

5. The control system as claimed in claim 1, wherein said liquid supply means includes an infrared receiver and a separate remote unit external of said liquid supply means for adjustment of the internal controls and to provide for a two-way infrared communication.

6. The control system as claimed in claim 1, including a tunnel section angled at 16° to a horizontal reference plane to narrow the beam to which an infrared photodiode is responsive as part of a control, to control the range of the infrared beam received by said liquid supply means.

7. The control system as claimed in claim 1, including control means for controlling the range of the infrared beam received by the liquid supply means to restrict and to narrow the beam to which a photodiode is responsive as a part of a returning signal from a remote object or a person is received by said liquid supply means.

8. The control system as claimed in claim 1, including a binary coded decimal switch in said liquid supply means, and external control means external of said liquid supply means for varying the binary coded decimal switch.

9. The control system as claimed in claim 1, wherein the solenoid valve is part of a powered sensor unit for detecting the presence of an individual or an object in front of a device to be remotely operated and under the control of the control system, and comprising:

means for transmitting pulses of infrared light energy with the preselected digital code towards an individual or object;

means operatively associated with said transmitting means and responsive to the digital code for receiving the infrared light energy reflected from the individual or object;

said microcontroller being responsive to operational amplifier means delivering a train of pulses for recognizing said train of pulses;

means for controlling the distance at which an object or individual can be detected;

means for determining the amplitude of the signal reflected and received by said receiving means, including means for adjustment of the amplitude; and adjustment means coupled with said solenoid for said solenoid valve and operatively coupled with said microcontroller including means for setting a binary coded decimal switch means for controlling the duration that the sensor unit output will operate the solenoid.

10. The control system as claimed in claim 7, wherein said transmitting means includes an infrared light emitting diode for sending out pulses of infrared light energy and a current regulating circuit for maintaining the output of said infrared light emitting diode constant throughout the life of the power supply.

11. The control system as claimed in claim 9, wherein said distance controlling means for controlling the distance at which an object or an individual can be detected includes voltage comparing means, and an amplifier responsive to the reflected signal received by the photodiode; and said voltage comparing means is responsive to said amplifier output for comparing the amplifier output to a voltage that represents a selected range setting.

12. The control system as claimed in claim 9, including visible light means associated with an impulse unit for illumination when said micro-controller detects that a power supply for the solenoid valve has dropped below a value below which the power supply replacement is considered desirable.

13. The control system as claimed in claim 9, wherein said transmitting means transmits infrared pulses of light energy at an angle approximately 16° from the horizontal.

14. The control system as claimed in claim 9, wherein said receiving means is responsive to said detecting means and said detecting means detects signals reflected from an individual or object transmitted at an angle to displace the beam from a horizontal plane.

15. The control system as claimed in claim 9, wherein said digital code includes a security feature so that said microprocessor is selectively controlled for activation thereof, and a remote unit is provided to adjust the operating parameters of said microprocessor externally thereof and remote therefrom.

16. The control system as claimed in claim 1, wherein said liquid supply means includes an infrared receiver and a remote unit external of said liquid supply means for adjustment of the internal controls, and including control means for controlling the range of the infrared beam received by said liquid supply means.

17. The control system as claimed in claim 1, including a remote control to vary the parameter of the system.

18. The control system as claimed in claim 1, including a remote control unit to control said microprocessor remote therefrom and externally thereof, said control unit including a self-contained battery powered infrared sensor.

19. The control system as claimed in claim 1, wherein said microprocessor is associated with said liquid supply fixture and includes an automatic range adjustment function, and including a remote control unit for commanding said automatic range adjustment.

20. The control system as claimed in claim 19, wherein said remote control and said microprocessor each includes a preselected digital security code so that said microprocessor is responsive solely to said remote control.

* * * * *